(12) United States Patent  
Hamajima

(10) Patent No.: US 6,721,016 B1  
(45) Date of Patent: Apr. 13, 2004

(54) JITTER DETECTION DEVICE AND IMAGE QUALITY CORRECTION DEVICE FOR ADAPTIVELY CHANGING CORRECTION WHEN REPRODUCING VIDEO SIGNAL

(75) Inventor: Yukinobu Hamajima, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 308 days.

(21) Appl. No.: 09/786,720

(22) PCT Filed: Jul. 6, 2000

(86) PCT No.: PCT/JP00/04479  
§ 371 (c)(1), (2), (4) Date: Mar. 8, 2001

(87) PCT Pub. No.: WO01/05143  
PCT Pub. Date: Jan. 18, 2001

(30) Foreign Application Priority Data

Jul. 9, 1999 (JP) ............................................. 11-195601

(51) Int. Cl.[7] ............................. H04N 7/00; H04N 5/21
(52) U.S. Cl. ....................... 348/497; 348/607; 348/625; 348/626
(58) Field of Search ................................. 348/511, 497, 348/529, 606, 625, 626, 806, 628, 629, 607

(56) References Cited

U.S. PATENT DOCUMENTS

| | | | | |
|---|---|---|---|---|
| 5,138,451 A | * | 8/1992 | Shinkawa et al. | .......... 358/148 |
| 6,208,092 B1 | * | 3/2001 | Kim | ........................... 315/370 |
| 6,288,748 B1 | * | 9/2001 | Watanabe et al. | ........... 348/511 |
| 6,498,629 B1 | * | 12/2002 | Carpentier et al. | ......... 348/867 |

FOREIGN PATENT DOCUMENTS

| | | |
|---|---|---|
| JP | 51-105716 | 9/1976 |
| JP | 55-75375 | 6/1980 |
| JP | 3-253178 | 11/1991 |

* cited by examiner

Primary Examiner—Victor R. Kostak  
(74) Attorney, Agent, or Firm—Wenderoth, Lind & Ponack, L.L.P.

(57) ABSTRACT

A jitter detection device for detecting jitter of a video signal (Sv) measures a vertical period (Stf(v)) of one field (v) of the video signal (Sv) to determine, based on a vertical period signal (Stf(v)), whether the video signal (Sv) jitters or not. If the number of times (Cej) it is successively determined that the video signal (Sv) jitters is smaller than a first predetermined number of times (Tej), the video signal (Sv) is confirmed to be a jitter signal (Svj). If the number of times (Cnj) it is successively determined that the video signal (Sv) does not jitter is smaller than a second predetermined number of times (Cnj), the video signal (Sv) is confirmed to be a non-jitter signal (Svjn).

18 Claims, 18 Drawing Sheets

Fig. 9

| | Svjn | |
|---|---|---|
| V | Stf(V) | $\Delta$Stf(V) |
| 0 | 3A51A | - |
| 1 | 3A51A | 0 |
| 2 | 3A51B | 1 |
| 3 | 3A51A | -1 |
| 4 | 3A51A | 0 |
| 5 | : | : |
| : | : | : |
| : | : | : |
| : | 3A51A | 0 |
| n-1 | 3A51A | 0 |

Fig. 10

| | Svj | |
|---|---|---|
| V | Stf(V) | $\Delta$Stf(V) |
| 0 | 3A51C | - |
| 1 | 3A507 | -15 |
| 2 | 3A501 | -6 |
| 3 | 3A505 | 4 |
| 4 | 3A51B | 16 |
| 5 | : | : |
| : | : | : |
| : | : | : |
| : | 3A51A | 3 |
| n-1 | 3A513 | -7 |

JITTER DETECTION DEVICE AND IMAGE QUALITY CORRECTION DEVICE FOR ADAPTIVELY CHANGING CORRECTION WHEN REPRODUCING VIDEO SIGNAL

TECHNICAL FIELD

This invention relates to image quality correction devices that carry out a variety of processes on an image signal to correct quality of an image reproduced based on the image signal and, more specifically, to an image quality correction device that corrects the image quality with an appropriate amount of correction according to an amount of jitter in a video signal that greatly affects the image quality.

BACKGROUND ART

FIG. 22 is a conventional image correction device used for an analog video signal Sv, based on which an image is displayed on an image display device used in a television set typified by an LCD or CRT. As shown in the drawing, a signal processing system SPc in the television set carries out a variety of processes on the video signal Sv, and generates signals required for displaying images on an image display device 9 (in the present example, CRT), that is, a scan speed modulation signal VSCc, an image signal Si, and a horizontal synchronization signal Hsync, and a vertical synchronization signal Vsync, each carrying information according to the characteristics of the image display device 9.

Based on the scan speed modulation signal VSCc, a scan speed modulation driver 6 carries out scanning at a predetermined speed, and generates an image quality correction scan drive signal Sscd to correct the quality of the image displayed on the image display device 9. Based on the image signal Si, a CRT driver 7 generates a CRT drive signal Scrtd for making the image display device 9 display an image. Based on synchronization signals Ssync, the deflector 8 generates a deflection drive signal Sdfd for making the image display device 9 operate with a predetermined amount of deflection and carry out raster scanning. The image display device 9 is driven by these drive signals Sscd, Scrtd, and Sdfd to display the image carried by the video signal Sv.

The signal processing system SPc includes a sync separator 4, an image quality correction device IQCc, and a signal processor 5. The sync separator 4 extracts the horizontal synchronization signal Hsync and the vertical synchronization signal Vsync from the video signal Sv.

Based on the horizontal synchronization signal Hsync and the vertical synchronization signal Vsync, the image quality correction device IQCc performs image quality correction processing on the video signal Sv, and generates an image-quality-corrected video signal SIQc, and also generates the scan speed modulation signal VSCc. Based on the image-quality corrected video signal SIQc, the signal processor 5 generates the image signal Si. Note that the operation of the signal processing system SPc is controlled by a controller 100c.

The image quality correction device IQCc includes a scan speed modulation signal generator 11 for defining a scan speed for the image display device 9, a horizontal edge enhancer 12 for defining an amount of horizontal edge enhancement for the image signal Si, a noise reducer (NR) 13 for reducing noise components included in the image signal Si, a multiplexer 14, a bus interface 15, and ROM 16.

Based on the horizontal synchronization signal Hsync, the vertical synchronization signal Vsync, and the video signal Sv, the scan speed modulation signal generator 11 determines a raster scan speed VSC (not shown) that corresponds to the image signal Si. Similarly, based on the horizontal synchronization signal Hsync, the vertical synchronization signal Vsync, and the video signal Sv, the horizontal edge enhancer 12 determines an amount of horizontal edge enhancement OE (not shown) of the video signal Sv.

Even if the video signal Sv is uniform in quality, the video carried by the video signal Sv and displayed on the image display device 9 is affected by physical characteristics of the television set including the image display device 9; a drive circuit system such as the scan speed modulation driver 6, the CRT driver 7, and the deflector 8; and a signal processing system. Therefore, the above-stated scan speed VSC and amount of horizontal edge enhancement OE cannot be uniquely determined based on the horizontal synchronization signal Hsync, the vertical synchronization signal Vsync, and the video signal Sv. For this reason, depending on the physical characteristics of the television set where the image quality correction device IQCc is used, each predetermined amount of correction is calculated in advance for a correcting operation of each of the scan speed modulation signal generator 11, the horizontal edge enhancer 12 and the NR 13.

Then, predetermined amounts of correction SCAc are stored in the ROM 16. When the quality of the image carried by the video signal Sv is corrected by the image quality correction device IQCc, the predetermined amounts of correction SCAc are read from the ROM 16 thorough a bus interface 15, and supplied to the scan speed modulation signal generator 11, the horizontal edge enhancer 12, and the NR 13 for correcting each operation.

Specifically, the predetermined amounts of correction SCAc include a correction amount of scan speed SVMc that is predetermined for the scan speed VSC defined by the scan speed modulation signal generator 11; a correction amount of horizontal edge enhancement SOEc that is predetermined for the amount of horizontal edge enhancement OE defined by the horizontal edge enhancer 12; and a correction amount of noise reduction SNRc that is predetermined for the amount of noise reduction by the NR 13.

As such, the horizontal edge enhancer 12 determines the amount of horizontal edge enhancement OE of the video signal SV based on the correction amount of horizontal edge enhancement SOEc supplied by the ROM 16 via the bus interface 15, and generates a horizontal-edge-enhancement-corrected signal OEc. The multiplexer 14 multiplexes the video signal Sv with the horizontal-edge-enhancement-corrected signal OEc, and generates a horizontal-edge-enhanced-corrected signal VOEc, which is the video signal Sv enhanced in horizontal edge by the amount of horizontal edge enhancement OE.

In a similar manner to that of the horizontal edge enhancer 12, the NR 13 reduces noise of the horizontal-edge-enhanced video signal VOEc, and generates the image-quality-corrected video signal SIQc, based on noise reduction characteristics corrected with the correction amount of noise reduction SNRc supplied by the ROM 16 through the bus interface 15.

The image processor 5 generates the image signal Si based on the image-quality-corrected video signal SIQc.

As described above, in the conventional image quality correction device IQCc, the video signal Sv is corrected in scan speed modulation, horizontal edge amount, and noise reduction for each predetermined amount, considering effects of the physical characteristics of the television set and other factors. In other words, the amount corrected by the image quality correction device IQCc is always constant irrespectively of change in quality of the video signal Sv.

However, the quality of the video signal Sv changes with time. If the video signal Sv jitters, the image-quality-corrected video signal SIQC and scan speed modulation signal VSCc outputted from the image quality correction device IQCc also jitter. Therefore, based on these jittering image-quality-corrected video signal SIQc and the scan speed modulation signal VSCc, the amount of jitter in video reproduced by the video display device 9 is increased, thereby deteriorating the reproduced video in quality.

For example, if the video signal Sv having jitter is subjected to horizontal edge enhancement for greatly enhancing the edge, glare at an edge part is enhanced by jitter in the horizontal edge enhancement signal itself. Thus, the jitter in the reproduced image is enhanced by the image quality correction processing. To prevent this, the amount of image quality correction for edge enhancement is reduced, while the one for noise reduction is increased.

In other words, to prevent video image quality deterioration or to improve video image quality resulting from the quality (jitter) of the video signal Sv, each correction by the scan speed modulation signal generator 11, the horizontal edge enhancer 12, and the NR 13 is adjusted according to the amount of jitter in the video signal Sv. That is, if the video signal Sv jitters, corrections by the scan speed modulation signal generator 11 and the horizontal edge enhancer 12 are suppressed, while the one by the NR 13 is promoted.

For this purpose, the presence or absence of jitter of the video signal Sv and the amount of jitter have to be accurately detected. Conventionally, however, means for accurately detecting the presence or absence of jitter of the input video signal Sv and the amount of jitter is not provided as being incorporated in an image display device such as a television set.

DISCLOSURE OF THE INVENTION

To solve the above problems, a first aspect of the present invention is a jitter detection device for detecting jitter in a video signal, comprising:

a vertical period measuring unit for measuring a vertical period for one field of the video signal and generating a vertical period signal;

a jitter determination unit for determining, based on the vertical period signal, whether the video signal jitters or not, and generating a jitter determination signal;

a jitter determination counter for counting, based on the jitter determination signal, the number of times it is successively determined that the video signal jitters, and generating a jitter determination counter signal;

a jitter confirmation unit for confirming, based on the jitter determination counter signal, that the video signal is a jitter signal if it is determined a first predetermined number of times that the video signal jitters;

a non-jitter counting unit for counting, based on the jitter determination signal, the number of times it is successively determined that the video signal does not jitter, and generating a non-jitter determination counter signal;

a non-jitter confirmation unit for confirming, based on the non-jitter determination counter signal, that the video signal is a non-jitter signal if it is determined a second predetermined number of times that the video signal does not jitter.

As described above, in the first aspect, the state and the jitter amount of the video signal can be accurately detected while eliminating the effects of disturbance factors such as noise components of the video signal or a television set side.

According to a second aspect, in the first aspect, the jitter determination unit:

determines that the video signal jitters when an absolute value of a difference between a vertical period of a present field and a vertical period of a previous field Stf is larger than 1; and determines that the video signal does not jitter when the absolute value is smaller than 1.

A fourth aspect is directed to an image quality correction device for correcting quality of an image reproduced based on a video signal according to an amount of jitter in the video signal, further including an image quality correction adjuster that comprises at least one of:

a noise reduction unit for reducing noise of the video signal based on a predetermined correction amount of noise reduction;

a horizontal edge enhancer for enhancing a horizontal edge of the video signal based on a predetermined correction amount of horizontal edge enhancement; and a scan speed modulator for enhancing a specific part of the video signal based on a predetermined amount of scan speed modulation, wherein:

according to the amount of jitter, the correction amount of noise reduction is increased by a predetermined adjustment value, the correction amount of horizontal edge enhancement is decreased by the adjustment value, and the amount of scan speed modulation is decreased by the adjustment value.

As described above, in the fourth aspect, image quality can be corrected with appropriate adjustment according to the state of jitter of the video signal.

According to a fifth aspect, in the fourth aspect, the image quality correction device further comprises a jitter detection device that comprises:

a vertical period measuring unit for measuring a vertical period for one field of the video signal and generating a vertical period signal;

a jitter determination unit for determining, based on the vertical period signal, whether the video signal jitters or not, and generating a jitter determination signal;

a jitter determination counter for counting, based on the jitter determination signal, the number of times it is successively determined that the video signal jitters, and generating a jitter determination counter signal;

a jitter confirmation unit for confirming, based on the jitter determination counter signal, that the video signal is a jitter signal if it is determined a first predetermined number of times that the video signal jitters;

a non-jitter counting unit for counting, based on the jitter determination signal, the number of times it is successively determined that the video signal does not jitter, and generating a non-jitter determination counter signal;

a non-jitter confirmation unit for confirming, based on the non-jitter determination counter signal, that the video signal is a non-jitter signal if it is determined a second predetermined number of times that the video signal does not jitter.

According to a sixth aspect, in the fifth aspect, the image quality correction adjuster dynamically adjusts at least one of the correction amount of noise reduction, the correction amount of horizontal edge enhancement, and the amount of scan speed modulation, while sequentially calculating a dispersion value of vertical periods.

According to a seventh aspect, in the sixth aspect, the image quality correction adjuster further comprises a histogram unit for generating a histogram composed of a frequency of appearance with respect to the amount of jitter, wherein:

at least one of the correction amount of noise reduction, the correction amount of horizontal edge enhancement, and the amount of scan speed modulation is adjusted by an amount of adjustment predetermined corresponding to the amount of jitter and the frequency of appearance that is larger than a predetermined threshold.

According to an eighth aspect, in the fourth aspect, the amount of jitter in a present field is used as the adjustment value immediately after the video signal is changed from a non-jitter signal to a jitter signal.

According to a ninth aspect, in the fifth aspect, the image quality correction device comprises an adjustment suppressor for suspending adjustment of at least one of the correction amount of noise reduction, the correction amount of horizontal edge enhancement, and the amount of scan speed modulation if the video signal is changed from the jitter signal to the non-jitter signal.

BRIEF DESCRIPTION OF THE DRAWINGS

FIG. 9 is a diagram demonstrating characteristic amounts of a non-jitter signal.

FIG. 10 is a diagram demonstrating characteristic amounts of a jitter signal.

BEST MODE FOR CARRYING OUT THE INVENTION

With reference to the drawings, the present invention is described in further detail.

First, with reference to FIGS. 1 through 14, an image quality correction device according to one embodiment of the present invention is described. Then, with reference to FIGS. 15 through 21, one exemplary modification of the image quality device according to the embodiment of the present invention is described in detail.

Prior to providing a specific description of the present embodiment, a basic concept of the image quality correction device according the present invention is first described. As stated above, in the image display device typified by a television set, quality of an image displayed on an image display device is generally affected by the quality of a video signal and physical characteristics of the television set. The quality of the video signal depends on jitter or noise, and the physical characteristics of the television set depend on a jitter response and frequency characteristics of a signal processing system, and a focus performance and gamma characteristics of the image display device.

In general, to improve the quality of the image displayed on the image display device, the processing includes horizontal edge enhancement with respect to a video signal, raster scan speed modulation with respect to changes of a luminance signal in the image display device (hereinafter referred to as "scan speed modulation"), and noise reduction processing for reducing the effects of noise components in the video signal. For a jittering video signal, horizontal edge enhancement and scan speed modulation cause further deterioration in quality of the reproduced image, and therefore have to be suppressed. Noise reduction, on the other hand, improves the reproduced image, and therefore does not have to be suppressed.

In other words, as the amount of jitter in the video signal increases, horizontal edge enhancement and high scan speed modulation are suppressed, while noise reduction is promoted. As the amount of jitter in the video signal decreases, horizontal edge enhancement and scan speed modulation are promoted, while noise reduction is decreased. As such, in the present invention, horizontal edge enhancement, scan speed modulation, and the noise reduction amount are appropriately adjusted according to the amount of jitter in the video signal, thereby ensuring the quality of the image reproduced by the image display device. (Embodiment)

Figure 1:
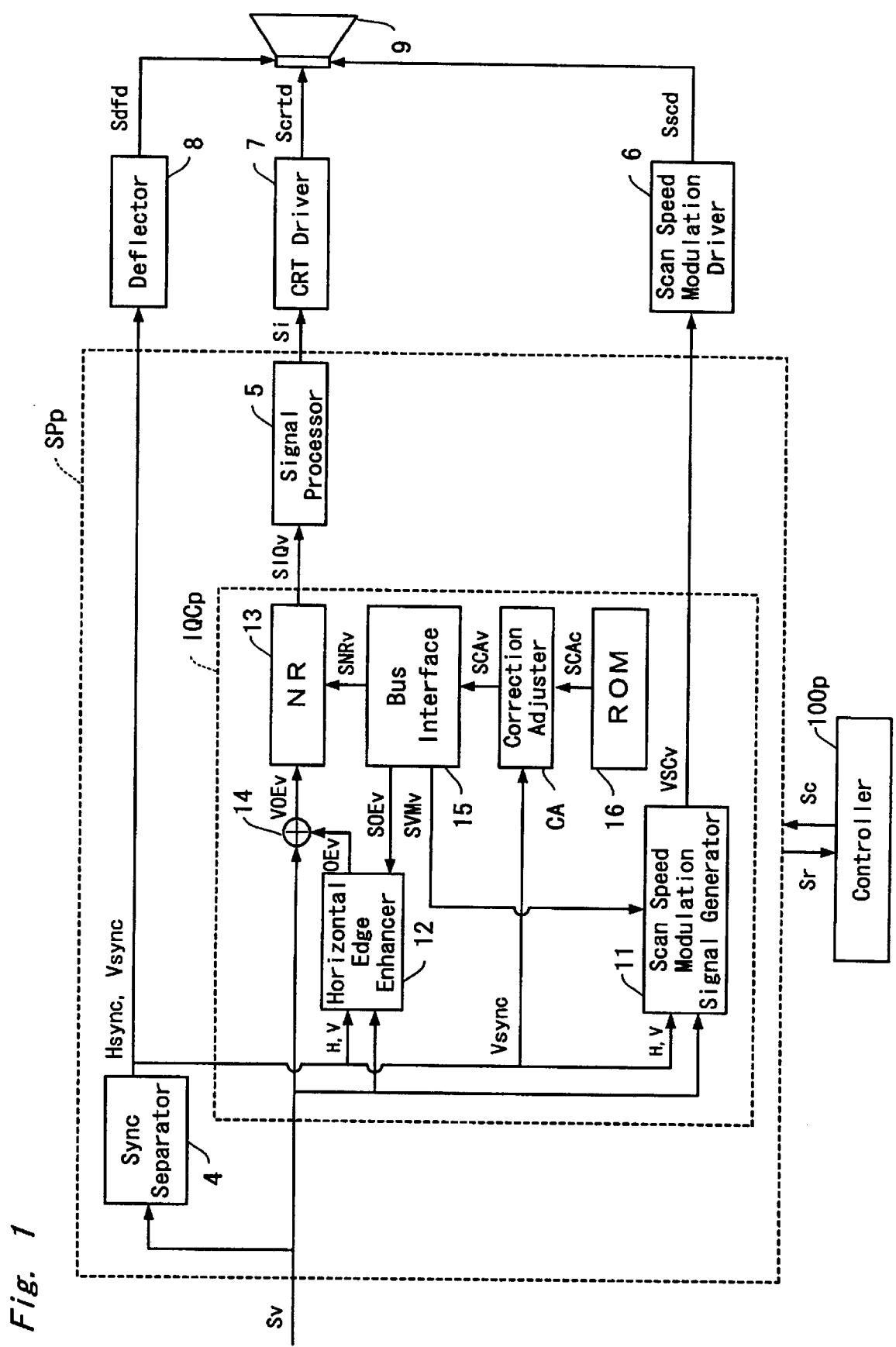
FIG. 1 is a block diagram showing the structure of an image quality correction device used in a television set, according to the present invention.

Shown in FIG. 1 is a state where the image quality correction device according to one embodiment of the present invention is used in a television set typified by an LCD or CRT. As shown in the drawing, in the television set, a signal processing system SPp carries out a variety of processes on a video signal Sv for generating a raster scan speed modulation signal VSCv, an image signal Si, and a horizontal synchronization signal Hsyn, and a vertical synchronization signal Vsync, each carrying information according to the characteristics of an image display device 9 and required for displaying an image on the image display device 9 (in the present example, CRT).

Based on the scan speed modulation signal VSCv, a scan speed modulation driver 6 changes a raster scan speed with a second-derivative signal indicating changes in luminance of the video signal Sv, and generates a scan drive signal Sscd for correcting the quality of the image displayed on the image display device 9. Based on the image signal Si, a CRT driver 7 generates a CRT drive signal Scrtd for making the image display device 9 display the image. A deflector 8 generates a deflection drive signal Sdfd for making the image display device 9 operate at a predetermined angle of deflection. Driven by these drive signals Sscd, Scrtd, and Sdfd, the image display device 9 displays the image carried by the video signal Sv.

The signal processing system SPp includes a sync separator 4, an image quality correction device IQCp, and a signal processor 5. The sync separator 4 extracts the horizontal synchronization signal Hsync and the vertical synchronization signal Vsync from the video signal Sv.

Based on the horizontal synchronization signal Hsync and the vertical synchronization signal Vsync, the image quality correction device IQCp carries out image quality correction processing on the video signal Sv, and generates an image-quality-corrected video signal SIQv and also a scan speed modulation signal VSCv. Based on the image-quality-corrected video signal SIQv, the signal processor 5 generates the image signal Si. Note that the operation of the signal processing system SPp is controlled by a controller 100p. Each component of the signal processing system SPp generates a signal indicating a state of its own, and outputs the signal as a state signal Sr to the controller 100p. Based on the received state signal Sr, the controller 100p recognizes the state of each component, and produces a control signal Sc for controlling the operation of each component.

The image quality correction device IQCp includes a scan speed modulation signal generator 11 for defining a scan speed VSC for the image display device 9, a horizontal edge enhancer 12 for defining an amount of horizontal edge enhancement for the image signal Si, a noise reducer (NR) 13, a multiplexer 14, a bus interface 15, a ROM 16, and a correction adjuster CA.

Stored in the ROM 16 are predetermined amounts of correction SCAc predetermined according to the physical characteristics of the television set used in the image quality correction device IQCp for correcting each function of the scan speed modulation signal generator 11, the horizontal edge enhancer 12, and the NR 13. The reason is that, even though the video signal Sv is uniform in quality, the video carried by the video signal Sv is displayed on the image display device 9 as being affected by the physical characteristics and other factors of the television set including the image display device 9; a drive circuit system such as the scan speed modulation driver 6, the CRT driver 7, and the deflector 8; and a signal processing system. For this reason, these amounts of correction are provided to compensate the effects of the physical characteristics of the television and other factors, based on the predetermined amounts of correction SCAc for the scan speed VSC, the amount of horizontal edge enhancement OE, and an amount of noise reduction NR that are all determined in advance.

The correction adjuster CA measures, based on the vertical synchronization signal Vsync extracted from the sync separator 4, the amount of jitter in the video signal Sv, and calculates, according to the measured jitter, each appropriate amount of correction by the signal generator 11, the horizontal edge enhancer 12, and the NR 13. Then, based on each appropriate amounts of correction, the predetermined amounts of correction SCAc read from the ROM 16 are adjusted, and appropriate amounts of correction SCAv are generated.

Specifically, the appropriate amounts of correction SCAv include an appropriate correction amount of scan speed SVMv for adjusting a predetermined amount of correction SVM of the scan speed VSC determined by the scan speed modulation signal generator 11; an appropriate correction amount of horizontal edge enhancement SOEv for adjusting the amount of horizontal edge enhancement OE determined by the horizontal edge enhancer 12; and an appropriate correction amount of noise reduction SNRv for adjusting a predetermined value SNR for adjusting the amount of noise reduction in the NR 13. Each appropriate amount of correction SCAv is supplied via the bus interface 15 to the speed modulation generator 11, the horizontal edge enhancer 12, and the NR 13 for correcting each operation.

Based on the horizontal synchronization signal Hsync, the vertical synchronization signal Vsync, the video signal Sv and the appropriate correction amount of scan speed SVMv, the scan speed modulation signal generator 11 determines the raster scan speed VSc of the image display device 9, and generates an appropriate scan speed modulation signal VSCv.

Similarly, based on the horizontal synchronization signal Hsync, the vertical synchronization signal Vsync, the video signal Sv and the appropriate correction amount of horizontal edge enhancement SOEv, the horizontal edge enhancer 12 determines the amount of horizontal edge enhancement OEv of the video signal Sv, and generates an appropriate corrected horizontal edge enhancement signal OEv.

The multiplexer 14 multiplexes the video signal Sv and the appropriate corrected horizontal edge enhancement signal OEv together, and generates, for output to the NR 13, an appropriate horizontal-edge-enhanced video signal VOEv, in which horizontal edge components of the video signal Sv are enhanced by an amount indicated by the appropriate corrected horizontal edge enhancement signal OEv.

The NR 13 reduces noise components in the appropriate horizontal-edge-enhanced video signal VOEv, and generates an image-quality-corrected video signal SIQv. This generation is carried out in a similar manner to that of the horizontal edge enhancer 12, based on the noise reduction characteristics after correction indicating the appropriate correction amount of noise reduction SNRv supplied by the correction adjuster CA via the bus interface 15.

The signal processor 5 generates the image signal Si based on the image-quality corrected video signal SIQv. In this fashion, the amount of jitter detected by the correction adjuster CA based on the vertical synchronization signal Vsync is referred to for optimizing the amounts of correction. With these amounts of correction, horizontal edge enhancement, noise reduction, and modulation of the raster scan speed of the image display device 9 are carried out, and an image is reproduced on the image display device 9 with high quality.

Figure 2:
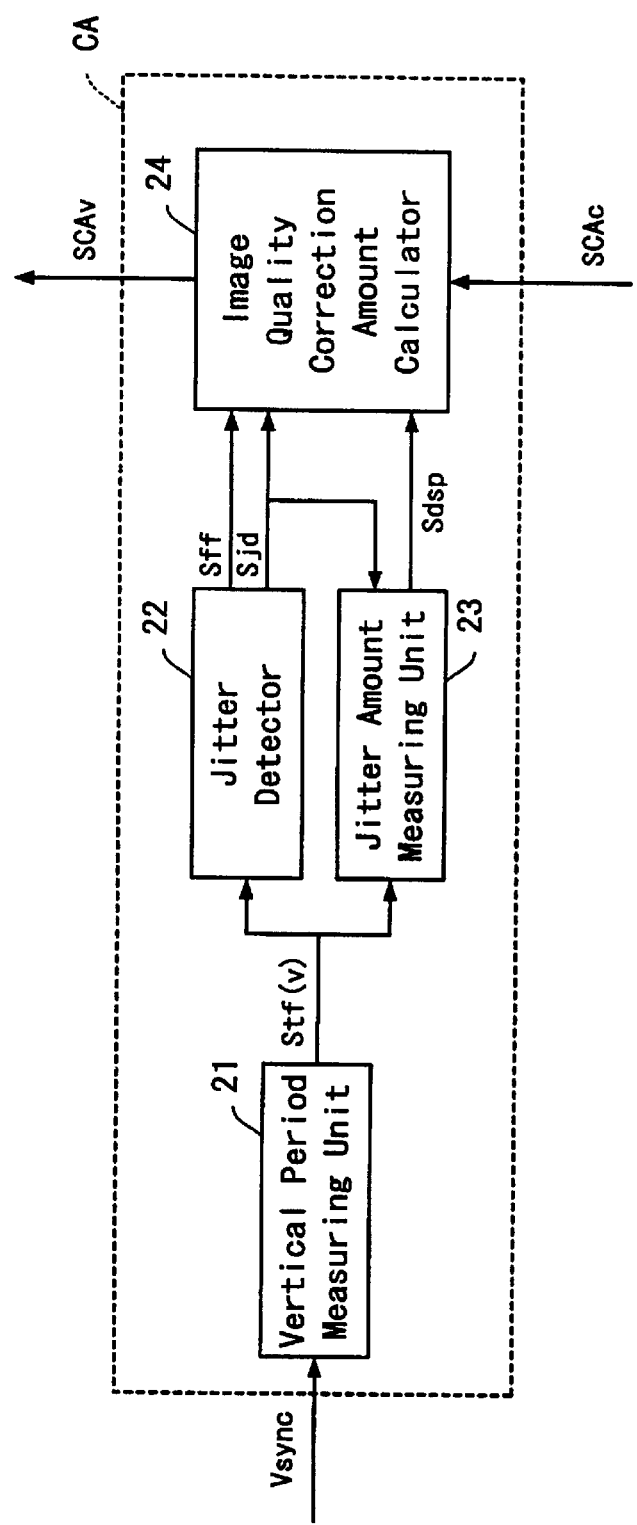
FIG. 2 is a block diagram showing the structure of a correction adjuster shown in FIG. 1.

With reference to FIG. 2, the structure and operation of the correction adjuster CA are described below. As shown in FIG. 2, the correction adjuster CA includes a vertical period measuring unit 21, a jitter detector 22, a jitter amount measuring unit 23, and an image quality correction amount calculator 24.

The vertical period measuring unit 21 measures, based on the vertical synchronization signal Vsync provided by the sync separator 4, a vertical period of a present field v of the video signal Sv, and generates a vertical period signal Stf(v).

The jitter detector 22 determines, based on the vertical period signal Stf(v) supplied by the vertical period measuring unit 21, whether the video signal Sv is a jitter signal Sv or a non-jitter signal Svjn, and generates a jitter detection signal Sjd, and also a jitter transition signal Sff indicating that the video signal Sv is changed from the jitter signal Svj to the jitter signal Svj and vice versa.

The jitter amount measuring unit 23 detects, based on the vertical period signal Stf(v) supplied by the vertical period measuring unit 21, the amount of jitter in the video signal Sv to generate a jitter amount signal Sdsp.

The image quality correction amount calculator 24 calculates, based on the jitter detection signal Sjd supplied by the jitter detector 22 and the jitter amount signal Sdsp supplied by the jitter amount measuring unit 23, each appropriate amount of correction for the scan speed modulation signal generator 11, the horizontal edge enhancer 12, and the NR 13 according to the amount of jitter in the video signal Sv. The image quality correction amount calculator 24 then adjusts the predetermined amounts of correction SCAc read from the ROM 16 to generate the appropriate amounts of correction SCAv (SVMv, SOEv, and SNR). Needless to say, the correction adjuster CA may be structured by a CPU. Note that, the vertical period Stf(v) may be obtained every several fields if it cannot be obtained every field due to the processing capabilities of the CPU.

With reference to FIGS. 9 and 10, characteristic amounts for making a determination of jitter/non-jitter of the video signal Sv are described. Shown in FIG. 9 are characteristic amounts of the video signal Sv that do not jitter, that is, non-jitter signal Svjn. In the drawing, a field V is shown in the left column, each field's vertical period is shown in the center column, and an inter-field vertical period difference ΔStf(v). The vertical period Stf(V) is a difference between a previous field's vertical period Stf(V−1) and a present field's vertical period Stf(V).

As shown in the drawing, in the non-jitter signal Svjin, the inter-field vertical period difference ΔStf(V) is within a range of −1, 0, and 1, where the field V=0 to n−1 (arbitrary positive integer). Such non-jitter signal Svjn is called a standard signal, in which the frequency of a color burst signal synchronizes with the horizontal and vertical frequencies.

If the horizontal and vertical frequencies are measured at a clock four times (4Fsc) that of the color burst signal, the horizontal frequency is 910 CLK, and the vertical frequency is 910 CLK×262.5=238875. These values are represented in hexadecimal as 38e horizontal counter value for the horizontal frequency, and 3a51b vertical counter value for the vertical frequency. In the present embodiment, the clock used for measuring the vertical period is a 4Fsc clock that is locked to burst but not locked horizontally. Therefore, a measurement error of ±1 CLK or less may occur. For this reason, the difference from the previous field's vertical period Stf(V), that is, the inter-field vertical period difference ΔStf(V) becomes ±2 CLK or less.

However, there is a near-zero probability that the inter-field vertical period difference ΔStf(V) actually becomes ±2 CLK, because the horizontal synchronization signal Hsync and the vertical synchronization signal Vsync are counted down from the stable burst signal. Based on that fact, the video signal Sv is determined as the non-jitter signal Svjn if the inter-field vertical period difference ΔStf(V) becomes ±1 or less. Besides the standard signal, a signal whose horizontal and vertical frequencies are constant can also be regarded as the standard signal (non-jitter signal Svjn).

Shown in FIG. 10 are characteristic amounts of the video signal Sv that jitters, that is, the jitter signal Svj. Unlike the case of the non-jitter signal Svjn shown in FIG. 9, in the jitter signal Svj, the inter-field vertical period difference ΔStf(V) varies within a range between −15 and 16, where the field V=0 to n−1. The jitter signal Svj is, for example, a video signal outputted from an analog video tape recorder. In this case, the structure of the analog video tape recorder makes it very difficult to completely eliminate jitter from an output video signal.

As shown in FIG. 10, in the jitter signal Svj, frequencies between fields V vary continuously. If an amount of variation dsp is measured, for example, if dispersion is calculated, the amount of jitter can be correctly detected. The amount of jitter should be measured at a horizontal rate, because adjusting the amount of image quality correction means correcting horizontal image quality. However, some difficulties occur as typically listed below.

First, the period has to be measured at a considerably high clock. Next, the amount of calculation is enormous. Furthermore, since the horizontal frequency is short, it is extremely difficult to ensure measurement accuracy.

In consideration of such difficulties, in the present invention, jitter is measured based on a vertical amount of jitter as a result of integrating jitter components of the jitter signal Svj. If jitter is measured based on the vertical amount of jitter, however, there is a concern that jitter is cancelled out when the vertical amounts of jitter are integrated or when the present field and the previous field have the same period.

In fact, however, in analog video tape recorders, there is a near-zero possibility that the present field and the previous field become the same in frequency. Also, there is a fact that the difference in the amount of jitter from the previous field becomes large when the amount of jitter is large. Based on these facts, in the present invention, jitter can be accurately measured based on the vertical amount of jitter. With reference to FIGS. 3 to 7, a method of measuring jitter is specifically described.

Figure 3:
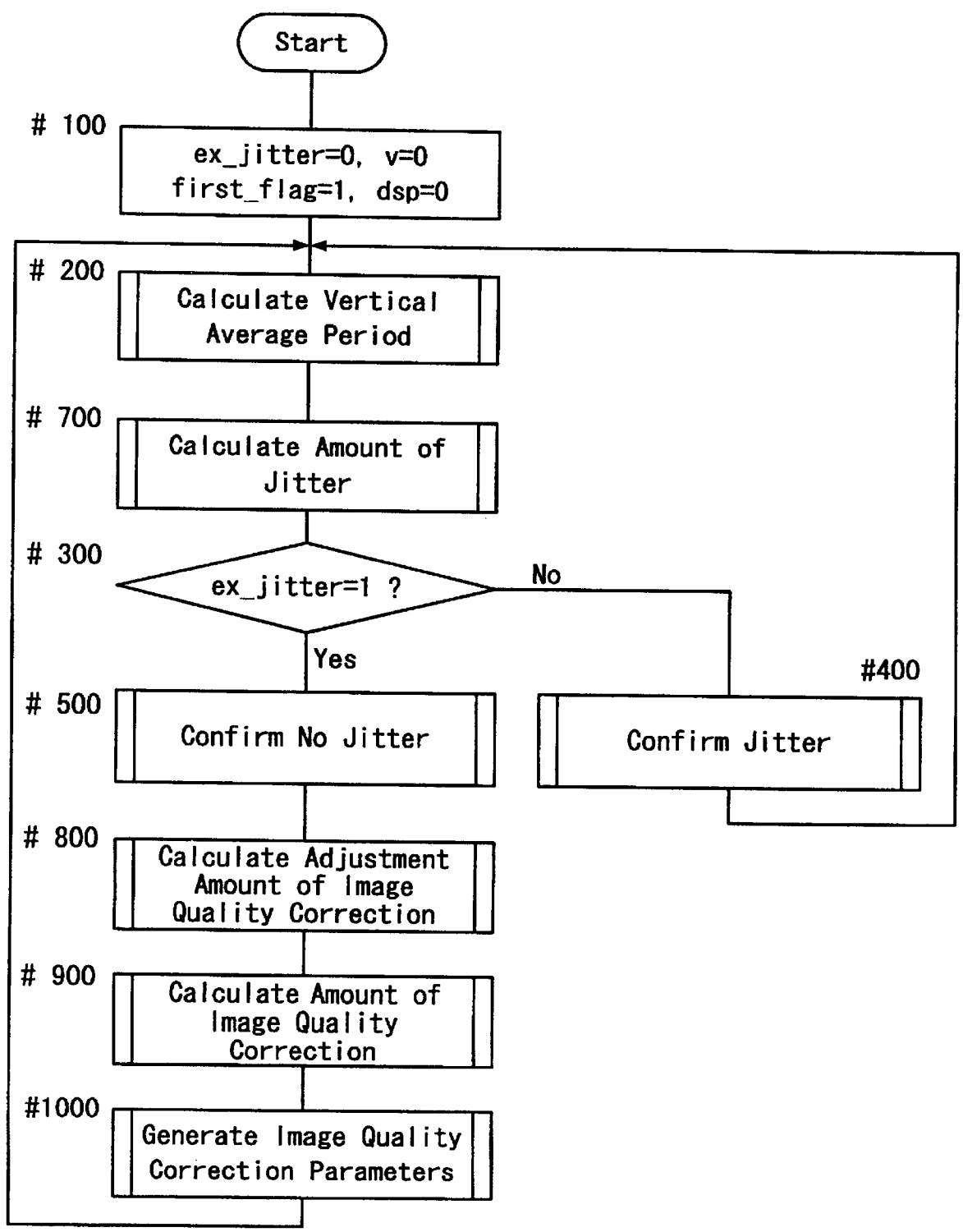
FIG. 3 is a flow chart showing the main operation of the correction adjuster shown in FIG. 2.

With reference to a main flow chart shown in FIG. 3, the main operation of the correction adjuster according to the embodiment of the present invention is described. When the television set equipped with the image quality correction device IQCp is started to operate, in step #100, the correction adjuster CA is initialized. In other word, a jitter confirmation flag ex_jitter corresponding to the jitter detection signal Sjd generated by the jitter detector 22 is set to 0; first_flag corresponding to the jitter transition signal Sff is set to 1; the field v, which is a variable corresponding to the present field V, is set to 0; and the amount of jitter dsp, which is a variable corresponding to the jitter amount signal Dsp, is set to 0.

The jitter confirmation flag ex_jitter 0 indicates that the video signal Sv is the non-jitter signal Svjn, while 1 indicates that the video signal Sv is the jitter signal Svj. The first_flag 0 indicates that correction adjustment is successively carried out on the same video signal, while 1 indicates that correction adjustment has not yet started on the same video signal Sv.

As such, the video signal Sv is handled as not jittering when the image quality correction device IQCp (correction adjuster CA) starts to operate. Therefore, as a matter of course, image quality correction adjustment has not started (first_flag=1). The procedure then goes to step #200.

In step #200, a vertical average period calculation subroutine for calculating the vertical period of the video signal is executed. The vertical average period calculation subroutine is executed by the vertical period measuring unit 21, and will be described in detail below with reference to FIG. 4. The procedure then goes to step #700.

In step #700, the amount of jitter in the video signal Sv is calculated. The jitter amount calculation subroutine in this step is executed by the jitter amount measuring unit 23, and will be described in detail below with reference to FIG. 7. The procedure then goes to step #300.

In step #300, it is determined whether or not the jitter confirmation flag ex_jitter is 1, that is, whether the video signal Sv is the jitter signal Svj. If No, that is, if it is determined that the video signal Sv does not jitter, the procedure then goes to a next step #400.

In step #400, a jitter confirmation subroutine for confirming that the video signal Sv is changed in state from not jittering (NO in step #300) to jittering is executed. That is, the jitter confirmation subroutine in this step serves to confirm that the video signal Sv is, in fact, the jitter signal Svj. The jitter confirmation subroutine is executed by the jitter detector 22, and will be described in detail below with reference to FIG. 5. The procedure then returns to the above step #200, wherein the vertical average period calculation subroutine is executed.

On the other hand, if Yes in step #300, that is, if it is confirmed that the video signal Sv is the jitter signal Svj, the procedure goes to step #500.

In step #500, a non-jitter confirmation subroutine for confirming that the video signal Sv is changed in state from jittering (Yes in step #300) to non-jittering is executed. That is, the non-jitter confirmation subroutine in this step serves to monitor the video signal Sv once confirmed as the jitter signal Svj in the jitter confirmation subroutine #400 to know any change to the non-jitter signal Svjn, and to confirm as it is. The non-jitter confirmation subroutine is executed by the jitter detector 22, and will be described in detail below with reference to FIG. 6. The procedure then goes to a next step #800.

In step #800, based on the jitter amount signal Sdsp supplied by the jitter amount measuring unit 23 and the jitter transition signal Sff outputted from the jitter detector 22, the appropriate adjustment amount of image quality correction for adjusting the predetermined amount of correction SCAc based on the state of jitter of the inputted video signal Sv. The adjustment amount of image quality correction calculation subroutine in this step is executed by the image quality correction amount calculator 24, and will be described in detail below with reference to FIG. 8. The procedure then goes to a next step #900.

In step #900, the amount of image quality correction to be applied to the video signal Sv is calculated. The image quality correction amount calculation amount subroutine in this step is executed by the image quality correction amount calculator 24, and will be described in detail below with reference to FIG. 3. The procedure then goes to a next step #1000.

In step #1000, the predetermined amount of correction SCAc read from the ROM 16 is adjusted to become the amount of image quality correction calculated in step #900, and the appropriate amount of correction SCAv is generated. The appropriate amount of correction SCAv is composed of the appropriate amount of noise reduction SNRv, the appropriate correction amount of horizontal edge enhancement SOEv, and the appropriate correction amount of scan speed SVMv. The procedure then returns to the above step #200.

<#200>

Figure 4:
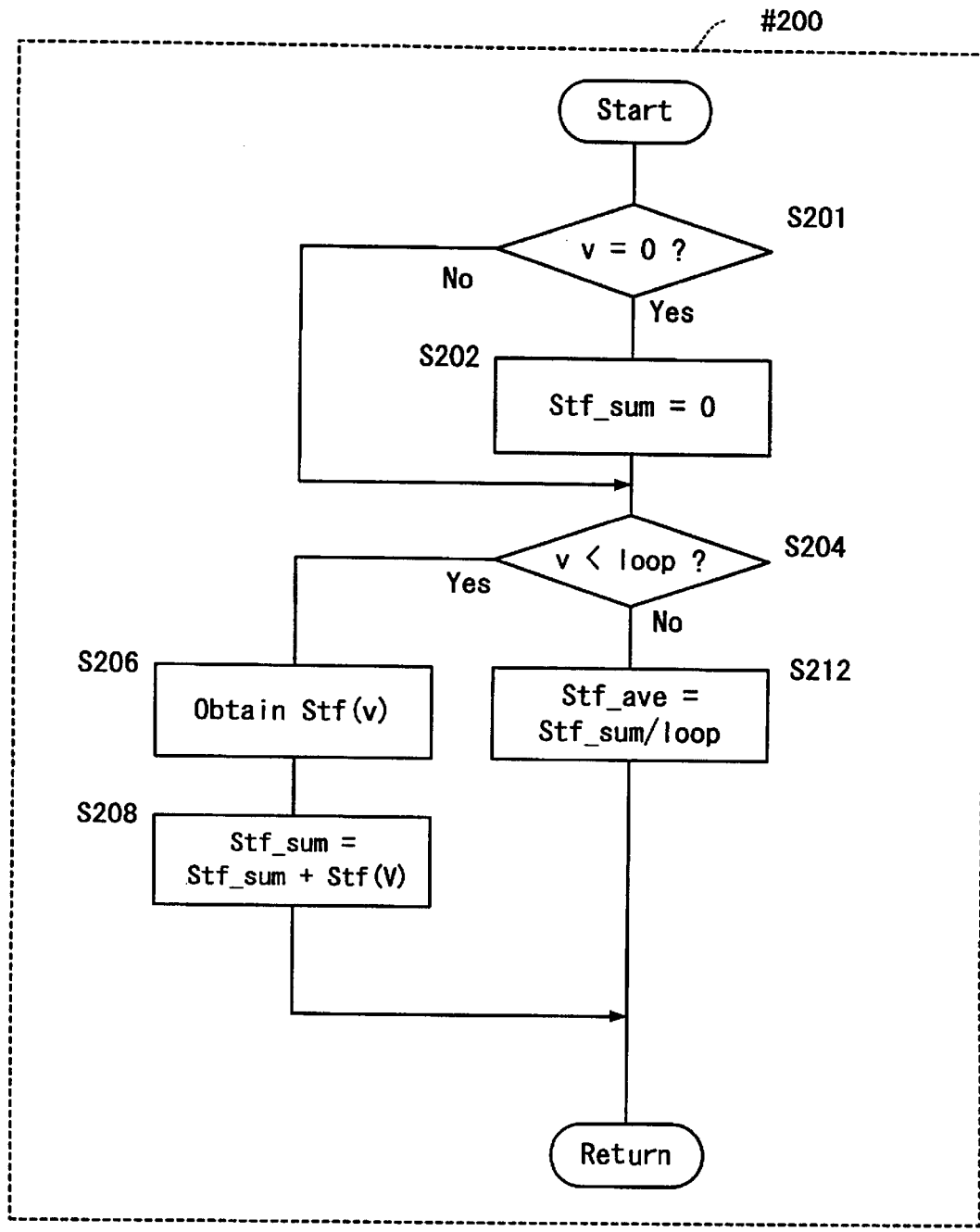
FIG. 4 is a flow chart showing the detailed operation of a vertical average period calculation subroutine shown in FIG. 3.

With reference to FIG. 4, the vertical average period calculation subroutine in the above step #200 is described below.

In the initialization process in step #100 the field v is set to 0, the amount of jitter dsp is to 0, the jitter confirmation flag ex_jitter is to 0, and first_flag is to 1. After that, in step S201, it is determined whether the field v is 0 or not. If Yes, the procedure goes to step S202.

In step S202, a stored vertical period Stf_sum, which is a variable indicating a value obtained by accumulating the vertical period Stf(v) of each field is set to 0, because this is the first time to calculate the first vertical average period for the video signal (Yes in step S201). The procedure then goes to step S204.

On the other hand, if No in step S201, that is, if the vertical average period is calculated for a second or thereafter field of the video signal Sv, the procedure skips the above step S202, and goes to step S204.

In step S204, it is determined whether or not the field v is smaller than loop having a predetermined value. If Yes, that is, if determined smaller, the procedure goes to step S206.

In step S206, the vertical period Stf(v) of the present field is obtained. The procedure goes to a next step S208.

In step S208, a variable Stf_sum is incremented by the vertical period Stf(v) obtained in step S206. Then, the procedure ends this subroutine.

On the other hand, if No in step S204, that is, if the field v is equal to loop, the procedure goes to step S212.

In step S212, the Stf_sum, which indicates accumulated vertical periods Stf(v) for the fields v corresponding to loop, is divided by loop for calculating the average Stf_ave. Then, the procedure ends this subroutine, and goes to the jitter amount calculation subroutine in step #700.

<#700>

Figure 7:
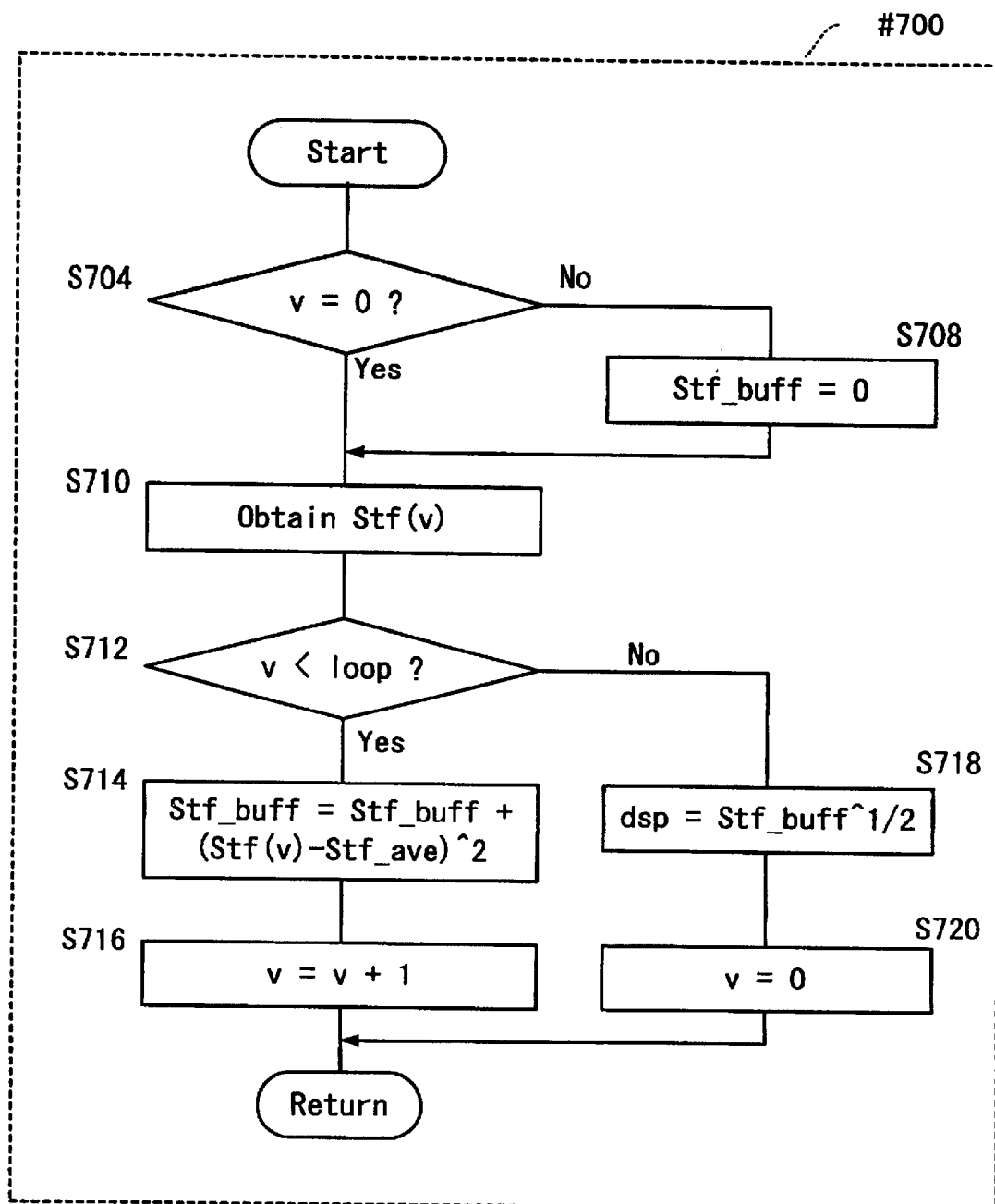
FIG. 7 is a flow chart showing the detailed operation of a jitter amount calculation subroutine shown in FIG. 3.

With reference to FIG. 7, the jitter amount calculation subroutine in the above step #700 is next described. The average vertical period Stf_ave is calculated in the jitter amount calculation subroutine of the above step #200, and then the subroutine in the present step is executed.

In step S704, it is determined whether the field v is 0 or not. If No, that is, if the field v is not the first field of the video signal Sv to be adjusted as to image quality correction, the procedure goes to step S708.

In step S708, a variable Stf_buff for calculating the vertical period Stf(v) is set to 0. The procedure then goes to step S710.

On the other hand, if Yes in step S704, that is, if the field v is the first field of the video signal Sv to be adjusted as to image quality correction, the procedure goes to step S710.

In step S710, the vertical period Stf(v) of the present field is obtained. The procedure then goes to step S712.

In step S712, it is determined whether the field v is smaller than loop or not. If Yes, that is, if the field v has a value smaller than loop, the procedure goes to step S614.

In step. S714, the variable Stf_buff is incremented by $(Stf(j)-Stf\_ave)^2$. The procedure then goes to a next step S716.

In step S716, the field v is incremented by 1. The procedure then ends the subroutine, and goes to step #300.

On the other hand, if No in step S712, that is, if it is determined that the field v is equal to loop, the procedure goes to step S718.

In step S718, Stf_buff$^{1/2}$ is set to the amount of jitter dsp. The procedure then goes to a next step S720.

In step S720, the field v is set to 0. The procedure then ends the subroutine, and goes to step #300.

<#400>

Figure 5:
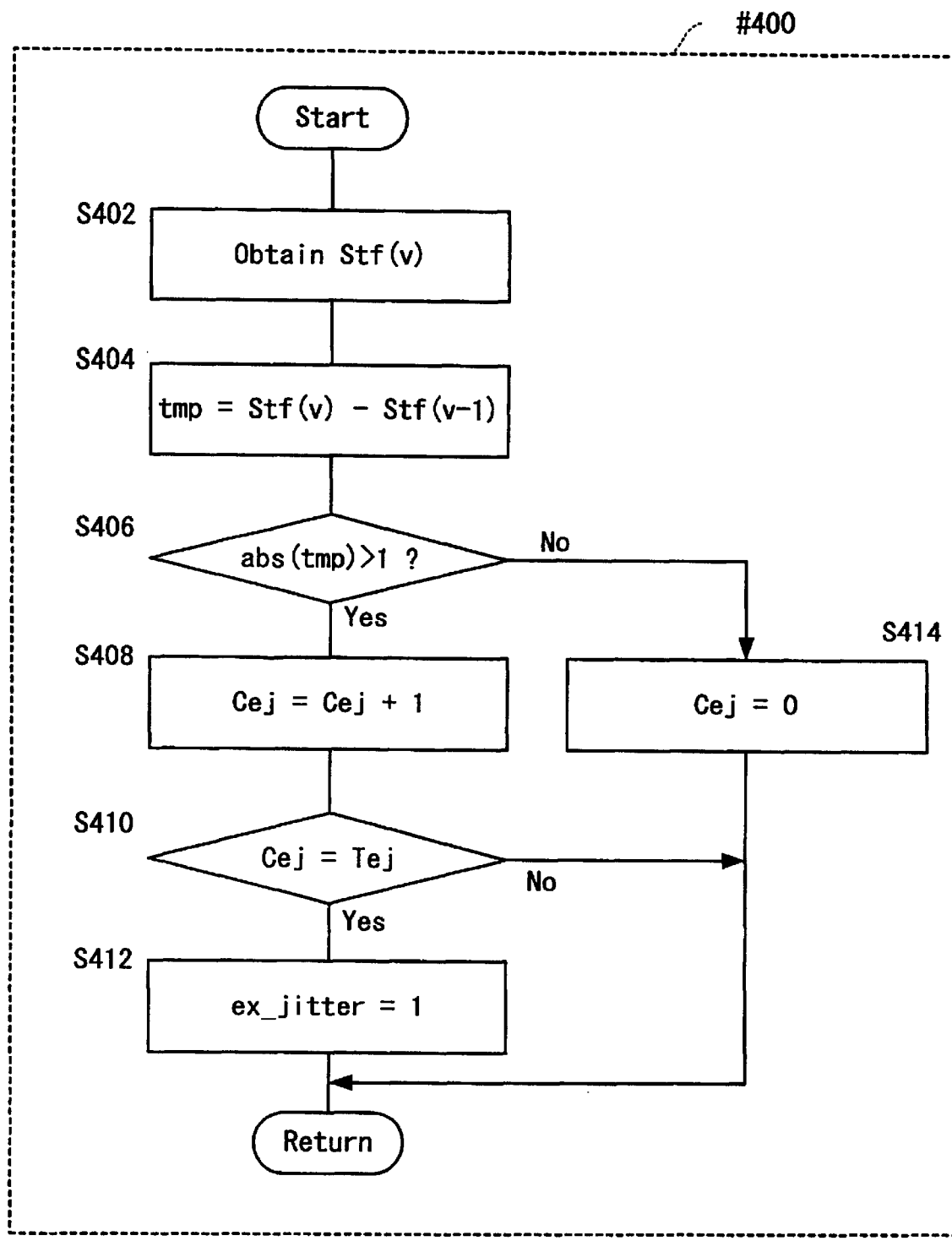
FIG. 5 is a flow chart showing the detailed operation of a jitter confirmation subroutine shown in FIG. 3.

With reference to FIG. 5, the jitter confirmation subroutine in step #400 is next described. No is determined in the above step #300, that is, the video signal Sv is the non-jitter signal, and then the procedure starts this subroutine.

First, in step S402, the vertical period Stf(v) of the present field is obtained. The procedure then goes to a next step S404.

In step S404, the vertical period of the previous field Stf(v−1) is subtracted from the vertical period of the present field Stf(v) for calculating an inter-field time difference tmp, which is a variable indicating the vertical period difference between successive two fields. The procedure then goes to a next step S406.

In step S406, it is determined whether an absolute value abs(tmp) of the in-field time difference tmp is larger than 1 or not. Note that, based on the fact that the absolute value abs (tmp) of the in-field time difference tmp of the jitter signal tends to become larger then 1, it is determined whether the video signal Sv jitters or not. If Yes, that is, if the video signal Sv is the jitter signal, the procedure goes to step S408.

In step S408, a jitter judge counter Cej is incremented by 1. The procedure then goes to a next step S410. Note that, even though the video signal Sv is the jitter signal, due to various factors in transmission paths and devices, larger absolute value abs (tmp) of the in-field time differences tmp may be temporarily detected, and it may be erroneously judged in step S406 that the signal jitters. In order to prevent such erroneous judgment, the jitter judge counter Cej is provided to detect the number of times of jitter signal judgment by step S406.

In step S410, it is determined whether the jitter judge counter Cej represents a value equal to a jitter confirmation reference number of times Tej . The jitter confirmation reference number of times Tej is a threshold for confirming that the video signal Sv is the jitter signal Svj only after it has been successively judged a predetermined number of times that the signal jitters, thereby preventing erroneous judgment in step S406. That is, it is confirmed that the video signal Sv is the jitter signal Svj only after it has been successively judged the jitter confirmation reference number of times Tej in step S406 that the signal jitters. The jitter confirmation reference number of times Tej can be set to an arbitrary value of 3 or more. As the jitter confirmation reference number of times Tej is larger, confirmation accuracy is improved more. Normally, 5 is enough to ensure confirmation accuracy at practical level. In this step, if No, that is, if it is not confirmed that the video signal Sv is the jitter signal Svj, the procedure ends the subroutine, and returns to #200.

On the other hand, if Yes in the present step S410, that is, if it is confirmed that the video signal is the jitter signal, the procedure goes to step S412.

In step S412, the jitter confirmation flag ex_jitter is set to 1. The procedure then ends the present subroutine, and returns to the above step #200.

If No in the above step S406, that is, if it is confirmed that the video signal Sv does not jitter, the procedure goes to step S414.

In step S414, the judge counter Cej is set to 0. The procedure then ends the present subroutine, and returns to the above step #200.

The operation of the present subroutine has been described above by each step, and will be specifically described below based on the state of the video signal Sv.

When the correction adjuster CA is initiated, the video signal Sv is confirmed to be the non-jitter signal (#100). Therefore, the procedure goes to steps #200, #300, and then step #400. After steps S402 and S404, it is judged in step S406 whether the video signal Sv jitters.

If judged as the jitter signal, the procedure goes to steps S408, S410, #200, #300, and then S402 to S408, and it is judged in step S410 that the signal is the jitter signal Svj . After that, in step S412, the jitter confirmation flag ex_jitter is set to 1, and the procedure then returns to step #200. After step #200, it is judged in step #300 as Yes, that is, it is judged that the jitter confirmation flag ex_jitter=1, the procedure goes to step #500.

<#500>

Figure 6:
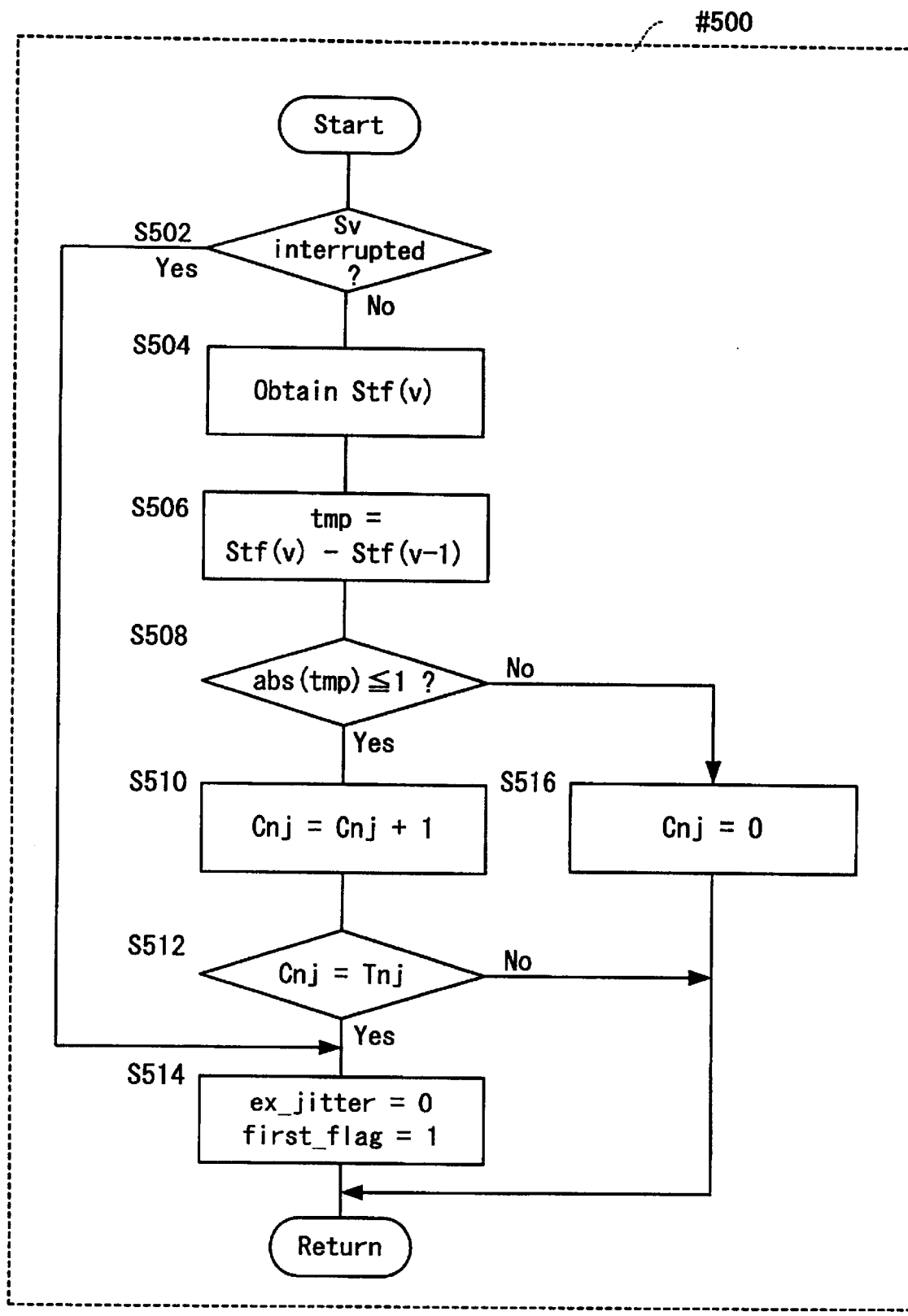
FIG. 6 is a flow chart showing the detailed operation of a non-jitter confirmation subroutine shown in FIG. 3.

With reference to FIG. 6, the non-jitter confirmation subroutine in the above step #500 is next described. After Yes in the above step #300, that is, after the jitter signal SVj is confirmed by the jitter confirmation subroutine of step #400, the subroutine of the present step starts to be executed.

In step S502, it is determined whether the video signal Sv supplied to the image quality correction device IQCp is interrupted or not. It is determined that the video signal Sv is interrupted if the horizontal synchronization signal Hsync or the vertical synchronization signal Vsync is not supplied or if the video signal Sv is switched to another video signal by a video signal switch button cooperatively provided to the image quality correction device IQCp. If No, that is, if it is determined that the video signal Sv is continuously supplied, the procedure goes to step S504.

In step S504, the vertical period Stf(v) is obtained. The procedure then goes to a next step S506.

In step S506, the in-field time difference tmp is calculated. The procedure then goes to a next step S508.

In step S508, it is determined whether or not the absolute value abs (tmp) of the in-field time difference tmp is 1 or less. If Yes, that is, if it is judged that the video signal is the non-jitter signal, the procedure goes to step S510.

In step S510, the non-jitter judge counter Cnj is incremented by 1. The procedure then goes to a next step S512.

Note that, even if the video signal Sv is the jitter signal, due to various factors in transmission paths and devices, a smaller absolute value absolute value abs(tmp) of the in-field time difference tmp may be temporarily detected, and it may be erroneously judged in step S508 that the signal does not jitter. In order to prevent such erroneous judgment, the non-jitter judge counter Cnj is provided to detect the number of times of non-jitter signal judgment by step S508.

Instep S512, it is determined whether the non-jitter judge counter Cnj represents a value equal to a non-jitter confirmation reference number of times Tnj. The non-jitter confirmation reference number of times Tnj is a threshold for confirming that the video signal Sv is the non-jitter signal Svjn only after it has been successively judged a predetermined number of times that the signal is the non-jitter signal, thereby preventing erroneous judgment in step 510. The non-jitter confirmation reference number of times Tnj can be set to an arbitrary value of 3 or more. As the non-jitter confirmation reference number of times Tnj is larger, confirmation accuracy is improved more. Normally, 5 is enough to ensure confirmation accuracy at practical level.

If No in this step, that is, if it is not confirmed that the video signal Sv is the non-jitter signal, the procedure ends the present subroutine. On the other hand, if Yes in this step, that is, if it is confirmed that the video signal Sv is the non-jitter signal Svjn, the procedure goes to step S514.

In step S514, the jitter confirmation flag ex_jitter is set to 0, and first_flag is set to 1. The procedure then ends the present subroutine, and goes to the image quality correction adjustment amount calculation subroutine of #800.

If Yes in the above step S502, that is, if it is determined that the video signal Sv is interrupted, the procedure skips the above steps S504 to S510, and goes to step S514. This is because if the video signal Sv is interrupted, image quality correction, which is the object of the present invention, is not required itself.

Furthermore, if No in step S508, that is, if it is judged that the video signal Sv is the jitter signal, the procedure goes to a next step S516.

In step S516, the non-jitter judge counter Cnj is set to 0, and then the procedure ends the present subroutine. The procedure then goes to the above-stated image quality correction adjustment calculation subroutine of step #800.

The operation of the present subroutine has been described by each step, and will be specifically described below based on the state of the video signal Sv. After the above steps #100 to #400, as to the video signal confirmed as the jitter signal Svj, it is judged in step S508 after steps S502, S504, and S506 whether jitter in the video signal Sv has not been solved, that is, whether the video signal is the non-jitter signal.

If judged as the non-jitter signal, the procedure goes to step S510. Then, if, in step S512, the non-jitter judgment number of times Cnj does not reach the non-jitter confirmation reference number of times Tnj, the procedure goes to the non-jitter confirmation subroutine of step #800 with the jitter confirmation flag ex_jitter=1. The procedure then goes to steps #500, #800, #900, #1000, #200, #700, and #300, and then returns to step #500. Then, after it is determined that the jitter signal Svj is changed to the non-jitter signal Svjn (Yes in step S512), the jitter confirmation flag ex_jitter=0 and first_flag=1 (step S514) in step S514 and, with that, the procedure goes to step #800.

<#800>

Figure 8:
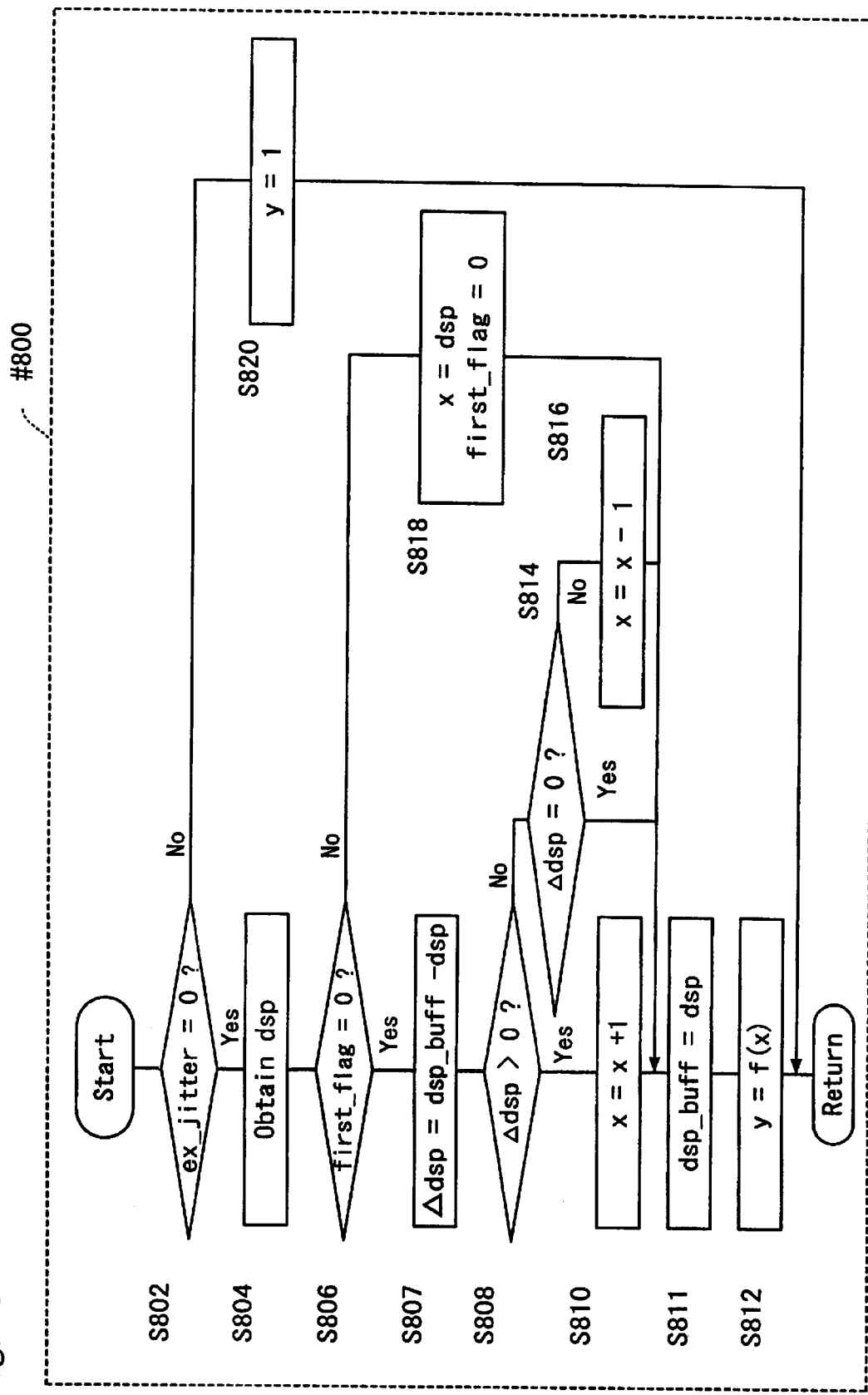
FIG. 8 is a flow chart showing the detailed operation of an adjustment amount of image quality correction calculation subroutine shown in FIG. 3.

With reference to FIG. 8, the image quality correction adjustment amount calculation subroutine in the above step #800 is next described. After the jitter state of the video signal Sv is detected through the non-jitter confirmation subroutine of #500, the following procedure is executed.

In step S802, it is determined whether the jitter confirmation flag ex_jitter is 0. If Yes, that is, if the video signal has been identified in #500 as the non-jitter signal Svjn, the procedure goes to step S804.

In step S804, the amount of jitter dsp found in step #700 (S718) is obtained. The procedure then goes to step S806.

In step S806, it is determined whether first_flag is 0. If Yes, that is, if the present video signal Sv is changed from the jitter signal Svj to the non-jitter signal Svjn and also is continuously subjected to image quality correction adjustment processing, the procedure goes to step S807.

In step S807, the amount of jitter dsp is subtracted from the amount of jitter of the previous field dsp_buff to calculate the in-field jitter amount difference Δdsp. The procedure then goes to step S808.

In step S808, it is determined whether the in-field jitter amount difference is larger than 0. If Yes, that is, if the amount of jitter is regarded as becoming larger, the procedure goes to step S810.

In step S810, an adjustment variable x for adjusting the amount of image quality correction is incremented by 1. The procedure then goes to a next step S811. This process is to match the present adjustment to a change of jitter in the video signal Sv. In other words, since jitter of the video signal Sv increases compared with that in the previous field, it is determined that a present adjustment amount of image quality correction y is not appropriate (insufficient adjustment), and the adjustment variable x is incremented for enhancing the adjustment. Then, the procedure goes to step S811.

In step S811, dsp_buff is set as the amount of jitter of the present field dsp. The procedure then goes to step S811.

In step S812, a value f(x+1) defined as a function of the adjustment variable x+1 is taken as the adjustment amount of image quality correction y. That is, the predetermined amount of correction read from the ROM 16 is adjusted with f(x+1), and the result is outputted as the appropriate amount of correction SCAv. The procedure then ends the present subroutine, and goes to step #900.

Note that, if No in the above step S808, that is, if the amount of jitter in the present field is regarded as not becoming larger than that in the previous field, the procedure goes to step S814.

In step S814, it is determined whether the in-field jitter amount difference Δdsp is 0. If yes, that is, if the amount of jitter is regarded as not changing between fields, the procedure goes to the above step S811.

In step S812, the value f(x) defined by the present correction variable x is taken as the adjustment amount of image quality correction y. That is, the predetermined amount of correction SCAc read from the ROM 16 is adjusted with the value f(x), and the result is outputted as the appropriate amount of correction SCAv.

Note that, if No in step S814, that is, if jitter of the video signal Sv demonstrates a decreasing tendency, the procedure goes to step S816.

In step S816, the adjustment variable x is decremented by 1. The procedure then goes to step S811. This is because, since jitter of the video signal Sv decreases compared with that in the previous field, it is determined that the present adjustment amount of image quality correction y is not appropriate (excessive adjustment), and the adjustment variable x is decremented for lessening the adjustment.

In step S812, a value f(x−1) defined as a function of the adjustment variable x−1 is taken as the adjustment amount of image quality correction y. That is, the predetermined amount of correction read from the ROM 16 is adjusted with f(x−1), and the result is outputted as the appropriate amount of correction SCAv.

On the other hand, if No in the above step S806, that is, if it is confirmed that the video signal Sv is changed from the non-jitter signal Svjn to the jitter signal Svj and correction adjustment is first started, the procedure goes to step S818.

In step S818, the adjustment variable x is set as the amount of jitter dsp, and first_flag is set to 0. The reason for this is as follows: first_flag is not 0 (step S806) and, therefore, when correction adjustment is first applied to the video signal Sv, the adjustment variable x as a reference is provided with the amount of jitter dsp at that moment, thereby appropriately setting, for the first time, the adjustment amount of image quality correction y. As such, first_flag is reset to 0, and thereafter the adjustment variable x defined by the amount of jitter dsp is taken as a reference for adjusting the adjustment amount of image quality correction y (S810, S816, and S812).

Furthermore, if No in the above step S802, that is, if it is confirmed that the video signal Sv is the non-jitter, the procedure goes to step S820.

In step S820, the adjustment amount of image quality correction is set to 1. In other words, the value of the predetermined amount of correction SCAc read from the ROM 16 is outputted, as it is, as the appropriate amount of correction SCAv.

Figure 11:
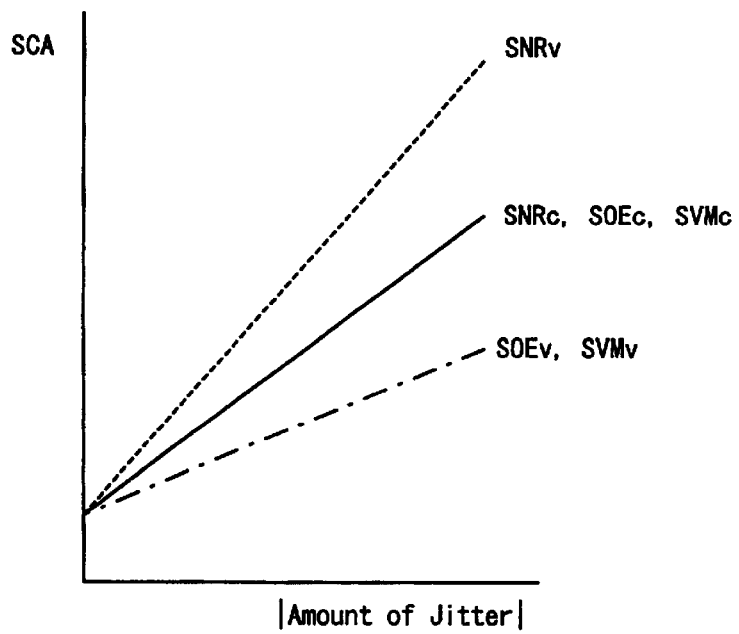
FIG. 11 is a diagram demonstrating a method for adjusting a slope of a predetermined amount of correction according to the amount of jitter.
Figure 12:
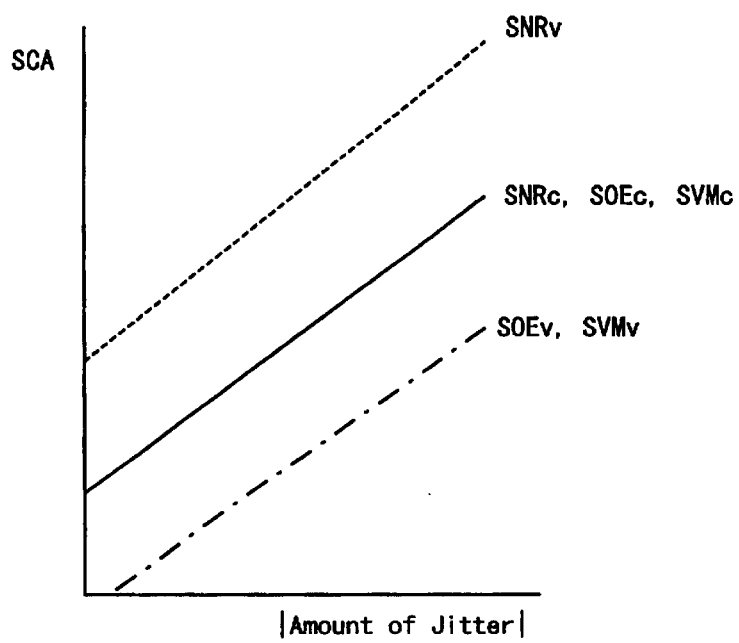
FIG. 12 is a diagram demonstrating a method for adjusting the predetermined amount of correction by uniformly increasing or decreasing the amount.

Next, with reference to FIGS. 11 and 12, methods of adjusting image quality correction are specifically described. There are two main categories for image quality correction. A first one includes enhancement of a portion varied in luminance (edge) to sharpen the reproduced image, such as edge correction and speed modulation. A second one includes removal of a portion slightly varied in luminance or random high-frequency components to stabilize the reproduced image, such as NR (noise reduction) and coring.

Image quality correction processes make the reproduced image better. When the video signal jitters, however, these correction processes do not improve but worsen the image quality if applied uniformly as is the case of the signal that is not jittering. Thus, in the present embodiment, it is determined whether the video signal Sv jitters, that is, whether between the jitter signal Svj or the non-jitter signal Svjn. Based on the determination result, the amount of image quality correction is automatically adjusted (controlled).

However, determination of the image quality may greatly vary depending on viewers. Therefore, in order to enable viewers to adjust (control) the image quality, the following two methods are provided as shown in FIGS. 11 and 12. In each drawing, the vertical axis represents the amount of image quality correction SCA; the horizontal axis represents the absolute value of the amount of jitter as the basis of adjustment (control) by a viewer; a solid line represents the amount of image quality correction SCA (SNR, SOE, and SVM); a dotted line represents the appropriate correction amount of noise reduction SNRv, and an alternate-dashed-and-dotted line represents the appropriate correction amount of horizontal edge enhancement SOEv and the appropriate correction amount of scan speed SVMv.

Exemplarily illustrated in FIG. 11 is a method of adjusting, according to the amount of jitter, slopes of predetermined amounts of correction SCAc (SNRc, SOEc, and SVMc), which are basic amounts for image quality correction. The appropriate correction amount of noise reduction SNRv (the dotted line) is obtained by adjusting the correction amount of noise reduction SNRc to the positive side according to the amount of noise. On the other hand, the appropriate correction amount of horizontal edge enhancement SOEv and the appropriate correction amount of scan speed SVMv are obtained by adjusting the correction amount of horizontal edge enhancement SOEc and the correction amount of scan speed SVMc, respectively, to the negative side according to the amount of noise. In this case, the adjusted slope can be further adjusted by the viewer to his/her taste.

Exemplarily illustrated in FIG. 12 is a method of uniformly increasing or decreasing the predetermined amounts of correction SCAc (SNRc, SOEc, and SVMc), which are the basic amounts for image quality correction, for adjustment. In a similar manner to that illustrated in FIG. 11, the appropriate correction amount of noise reduction SNRv (the dotted line) is adjusted in the positive side based on the amount of noise. On the other hand, the appropriate correction amount of horizontal edge enhancement SOEv and the appropriate correction amount of scan speed SVMv are adjusted in the negative side according to the amount of noise. In this case, the uniformly adjusted amount can be further increased or decreased for adjustment by the viewer to his/her taste.

<#900>

Figure 13:
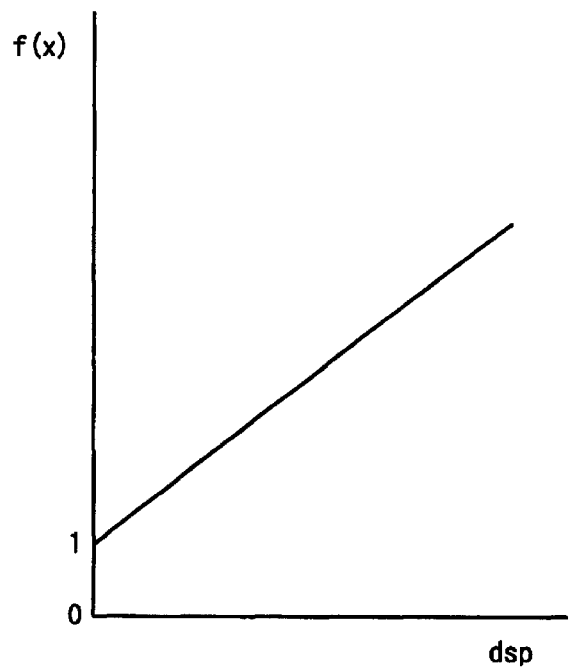
FIG. 13 is a diagram demonstrating an image quality correction amount calculation subroutine shown in FIG. 3.

With reference to FIG. 13, a concept of an image quality correction amount calculation subroutine of step #900 is described. In the drawing, the vertical axis represents the amount of image quality correction y=f(x) and the horizontal axis represents the amount of jitter dsp. A solid line represents a relation between the amount of jitter dsp and the amount of image quality correction f(x), but this line is not necessarily solid, but may be a curve defined by a predetermined curvature. Exemplarily illustrated in the drawing is the method of adjusting the slope with respect to the basic amount of correction shown in FIG. 13.

<#1000>

Figure 14:
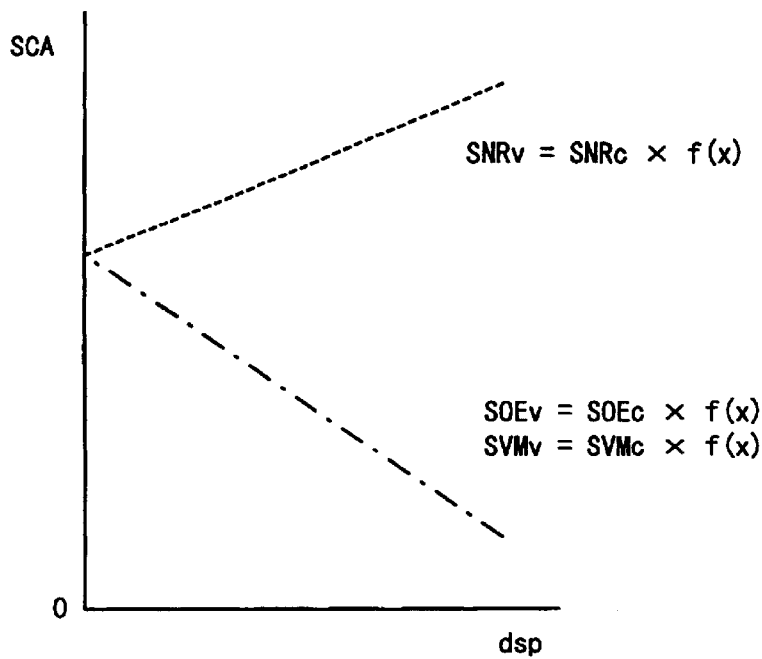
FIG. 14 is a diagram demonstrating an image quality correction parameter generation subroutine shown in FIG. 3.

With reference to FIG. 14, a concept of an image quality correction parameter generation subroutine of step #1000 is described. In the drawing, the vertical axis represents the amount of image quality correction SCA (SNR, SOE, and SVM); the horizontal axis represents the amount of jitter dsp; a dotted line represents the appropriate correction amount of noise reduction SNRv; and an alternate-dotted-and-dashed line represents the appropriate correction amount of horizontal edge enhancement SOEv and the appropriate correction amount of scan speed SVMv.

As described above, the appropriate correction amount of noise reduction SNRv is adjusted in the positive side according to jitter, and calculated by multiplying the correction amount of noise reduction SNRc by the adjustment amount of image quality correction y=f(x). The appropriate correction amount of horizontal edge enhancement SOEv and the appropriate correction amount of scan speed SVMv are both adjusted in the negative side according to jitter, and calculated by multiplying the correction amount of horizontal edge enhancement SOEc and the correction amount of scan speed SVMc by the adjustment amount of image quality correction y=f(x), respectively.

With reference to FIGS. 15 through 21, one exemplary modification of the correction adjuster CA according to the embodiment of the present invention is described below. The correction adjuster CA according to the present embodiment is the same in structure as that shown in FIG. 2, but different in operation.

Figure 15:
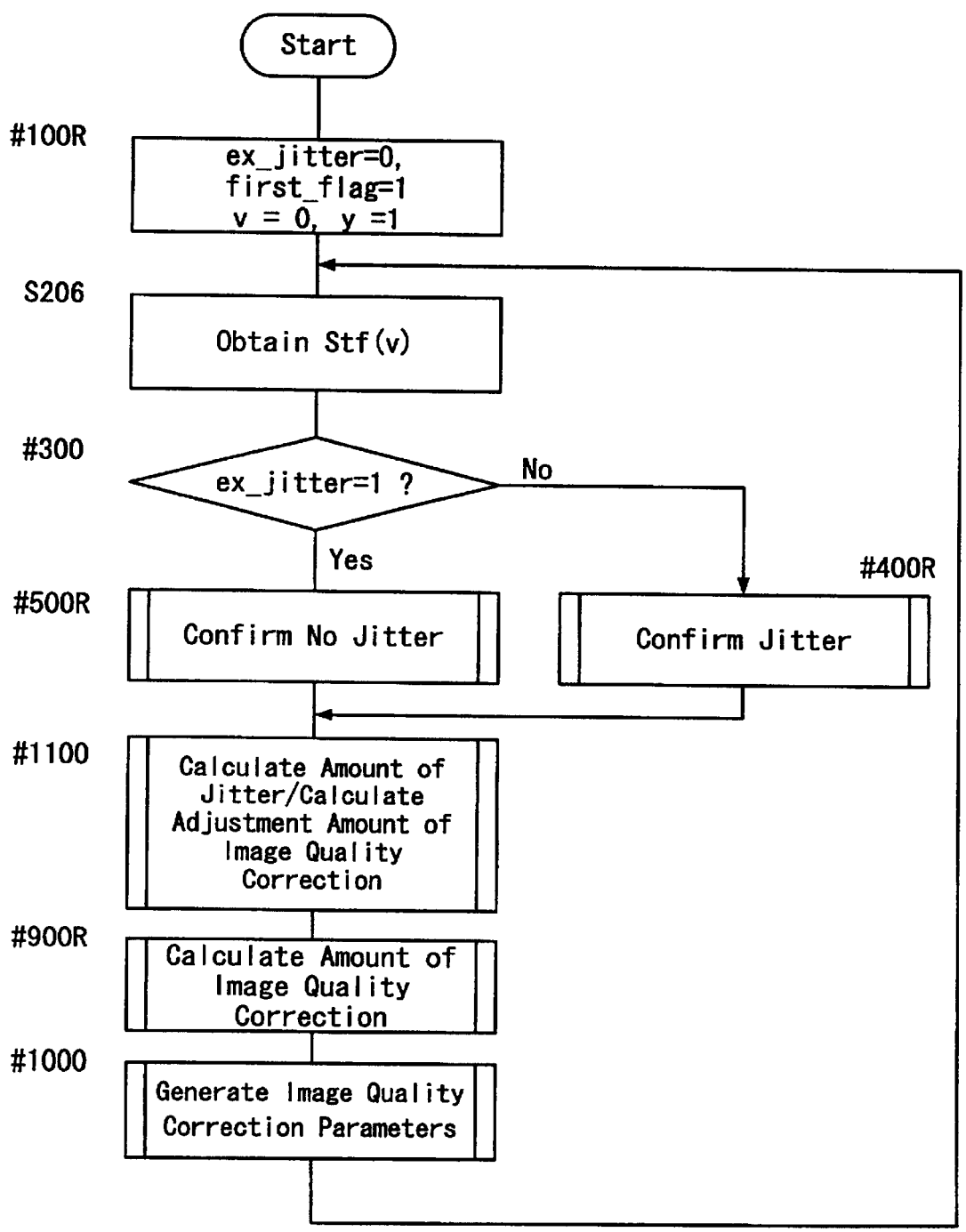
FIG. 15 is a flow chart showing the main operation of a correction adjuster according to one exemplary modification of the embodiment of the present invention.

First, with reference to a main flow chart shown in FIG. 15, the main operation of the correction adjuster CA according to the present exemplary modification is described. In the present exemplary modification, the vertical average period subroutine of step #200, the jitter amount calculation subroutine of step #700, and the image quality correction adjustment amount calculation subroutine of step #800 are mainly achieved in a simplified manner. Therefore, as shown in FIG. 15, steps #100, #200, #400, #500 and #900 shown in FIG. 3 are replaced by #100R, S206, #400R, #500R, and #900R, respectively, in the present exemplary modification. Also in the present exemplary modification, #700 in the embodiment is deleted.

Furthermore, the image quality adjustment amount calculation subroutine of step #800 and the image quality correction amount calculation subroutine of step #900 in the embodiment are replaced by an image quality adjustment amount calculation/image quality correction amount calculation subroutine of step #1100.

With reference to FIG. 15, the main operation of the correction adjuster CA according to the present exemplary modification is briefly described below and then, with reference to FIGS. 11, 12, and 13, the operation in each step is described.

When the television set equipped with the image quality correction device IQCp is started to operate, in step #100R, the correction adjuster CA is first initialized. In other word, the jitter confirmation flag ex_jitter is set to 0; first_flag is set to 1; the field v is set to 0; and the adjustment amount of image quality correction y is set to 0.

in step #100R, the correction adjuster CA is first initialized. In other word, the jitter confirmation flag ex_jitter is set to 0; first_flag is set to 1; the field v is set to 0; and the adjustment amount of image quality correction y is set to 0.

As such, in a similar manner to that in the embodiment, when the image quality correction device IQCp (correction adjuster CA) is started to operate, the video signal Sv is regarded as not jittering, and also image quality correction adjustment is regarded as not having been started. However; the predetermined amount of correction SCAc read from the ROM 16 is set, as it is, as the appropriate amount of correction SCAv (the adjustment amount of image quality correction y=1). The procedure then goes to a next step S206.

In step S206, similarly in the above described S206, the vertical period Stf(v) is obtained. Then, if it is determined in step #300 that it is not confirmed that the video signal Sv is the jitter signal Svj, the procedure goes to a next step #400R. If confirmed as the jitter signal Svj, the procedure goes to step #500R.

Figure 16:
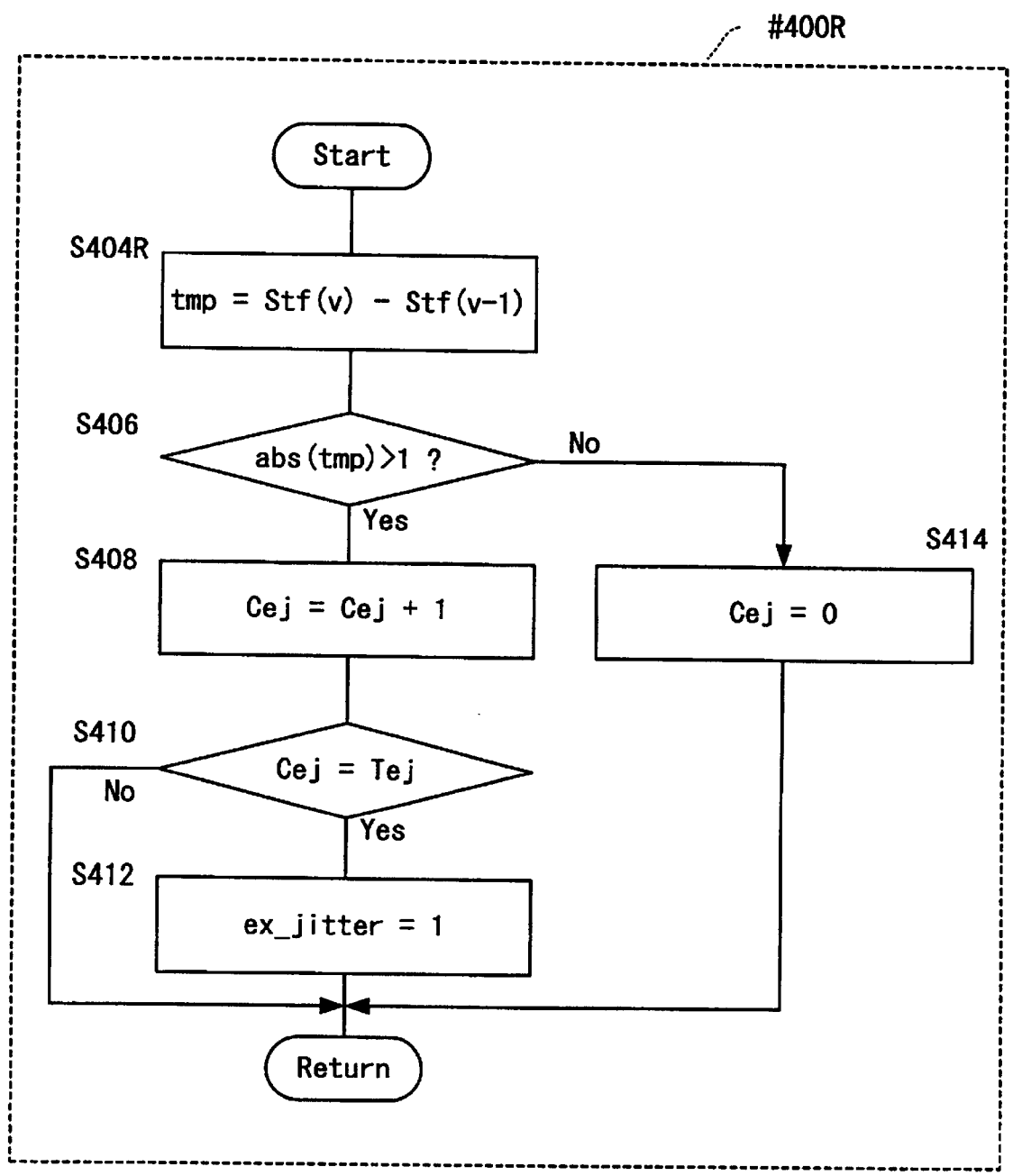
FIG. 16 is a flow chart showing the detailed operation of a jitter confirmation subroutine shown in FIG. 15.

A detailed flow chart of step #400R is shown in FIG. 16. The subroutine in the present embodiment is similar to the jitter confirmation subroutine already described in the above embodiment with reference to FIG. 5 except that step S402 for obtaining the vertical period Stf(v) is deleted. Therefore, description is omitted herein.

Figure 17:
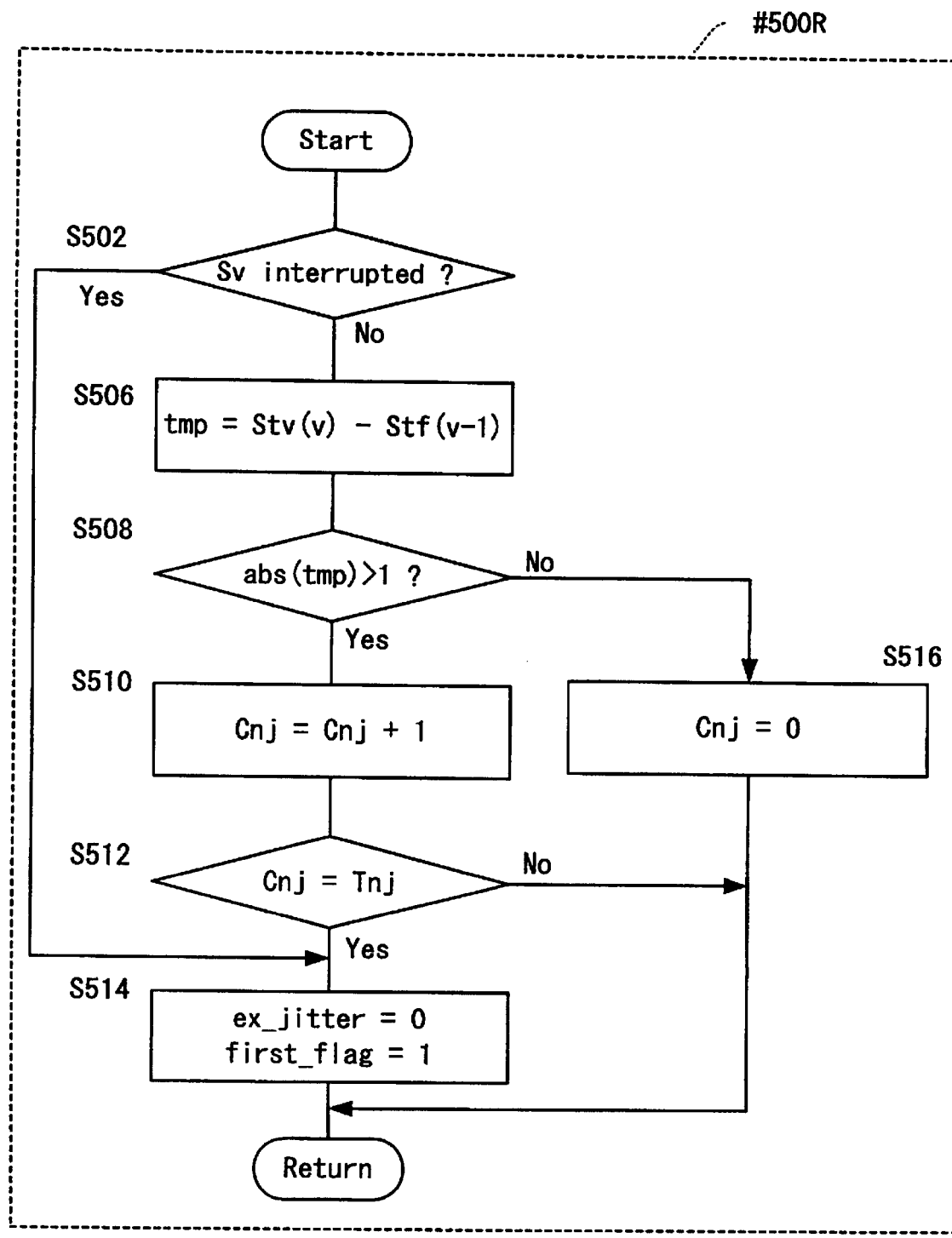
FIG. 17 is a flow chart showing the detailed operation of a non-jitter confirmation subroutine shown in FIG. 15.

A detailed flow chart of step #500R is shown in FIG. 17. The subroutine in the present embodiment is similar to the non-jitter confirmation subroutine already described in the above embodiment with reference to FIG. 6 except that step S504 for obtaining the vertical period Stf(v) is deleted. Therefore, description is omitted herein.

<#1100>.

Figure 20:
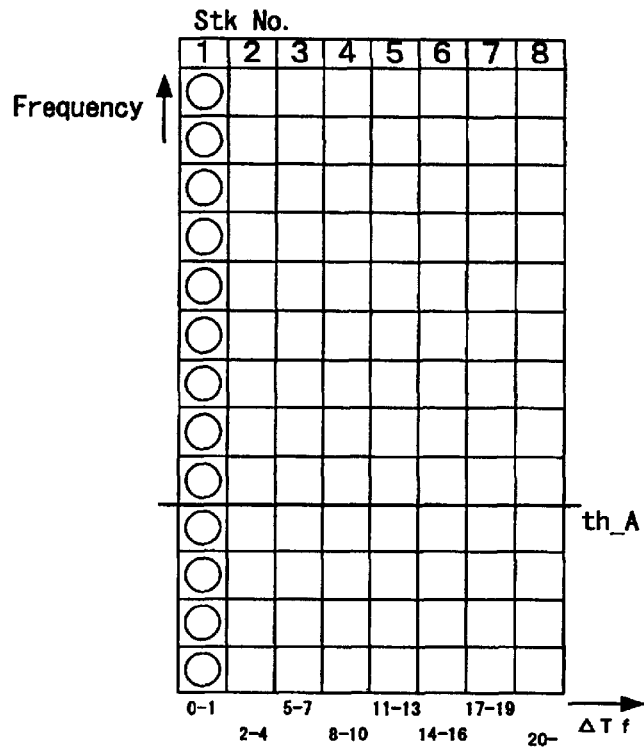
FIG. 20 is a diagram demonstrating the jitter amount calculation/image quality correction amount calculation subroutine shown in FIG. 15.
Figure 21:
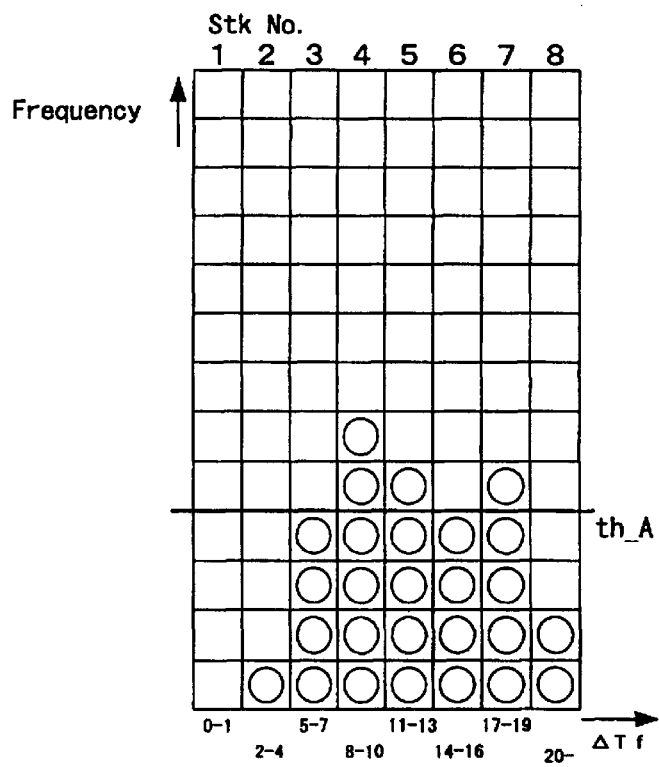
FIG. 21 is another diagram demonstrating the jitter amount calculation/image quality correction amount calculation subroutine shown in FIG. 15.
Figure 22:
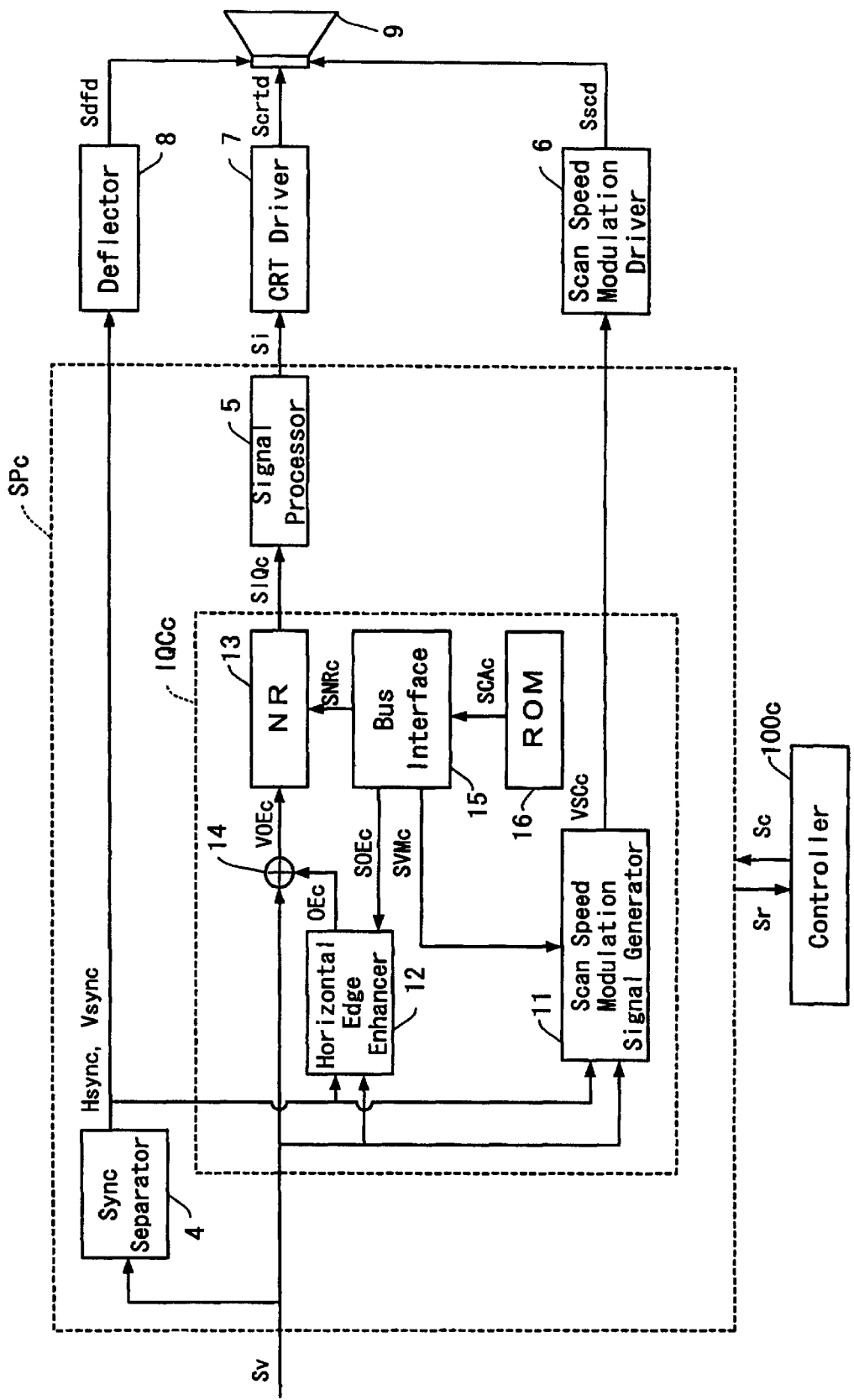
FIG. 22 is a block diagram showing the structure of a conventional image quality correction device used in a television set.

With reference to FIGS. 20 and 21, the concept of processing in the jitter amount calculation/image quality correction adjustment amount calculation subroutine in step #1100 is described below.

This processing is suggested as an alternative measure, because calculation of the amount of jitter dsp and the amount of correction increases a load on a computer according to the above embodiment of the present invention. In each drawing, the vertical axis represents frequencies, while the horizontal axis represents stacks. A stack (stk) indicates a vertical period difference (difference in the number of CLK) ΔTf between the previous field (v−1) and the present field (v), but may be the in-field vertical period difference ΔStf(v)

In the present example, eight stacks are provided whose in-field period differences ΔTf are 0–1, 2–4, 5–7, 8–10, 11–13, 14–16, 17–19, and 20 or more, respectively. The number of stacks Stk and the in-field period difference ΔTfg are determined as appropriate in consideration of effects of correction adjustment. Each stack Stk is given a stack number (Stk No.) as 1, 2, 3, 4, 5, 6, 7, and 8, based on each in-field period difference ΔTfg. Hereinafter, each stack is identified as stk(k), where k is a variable representing the stack number.

In the present exemplary modification, the jitter amount calculation/image quality correction adjustment amount calculation is carried out through the following steps. First, the stacks Stk(k) is provided as many as the level to which the predetermined amount of correction SCAc is desired to be changed.

Then, the stack Stk(k) that corresponds to the value of the in-field period difference ΔTfg accumulates the frequency of appearance of that value, and a histogram of the amount of jitter is obtained. Among the stacks having more frequencies of appearance than a threshold th_A for n fields, the one having the largest in-field period difference ΔTfg is selected, and given a correction value from a ROM table. Note that to smooth the correction result, the stack Stk and the adjustment value are set appropriately.

With reference to FIG. 21 for describing the above, stacks having more frequencies of appearance than the threshold th_A are Stk(4), Stk(5), and Stk(7). Of these three stacks Stk, Stk (7) has the largest in in-field period difference ΔTf, and therefore, the correction value to Stk(7) is read from the ROM table.

Figure 18:
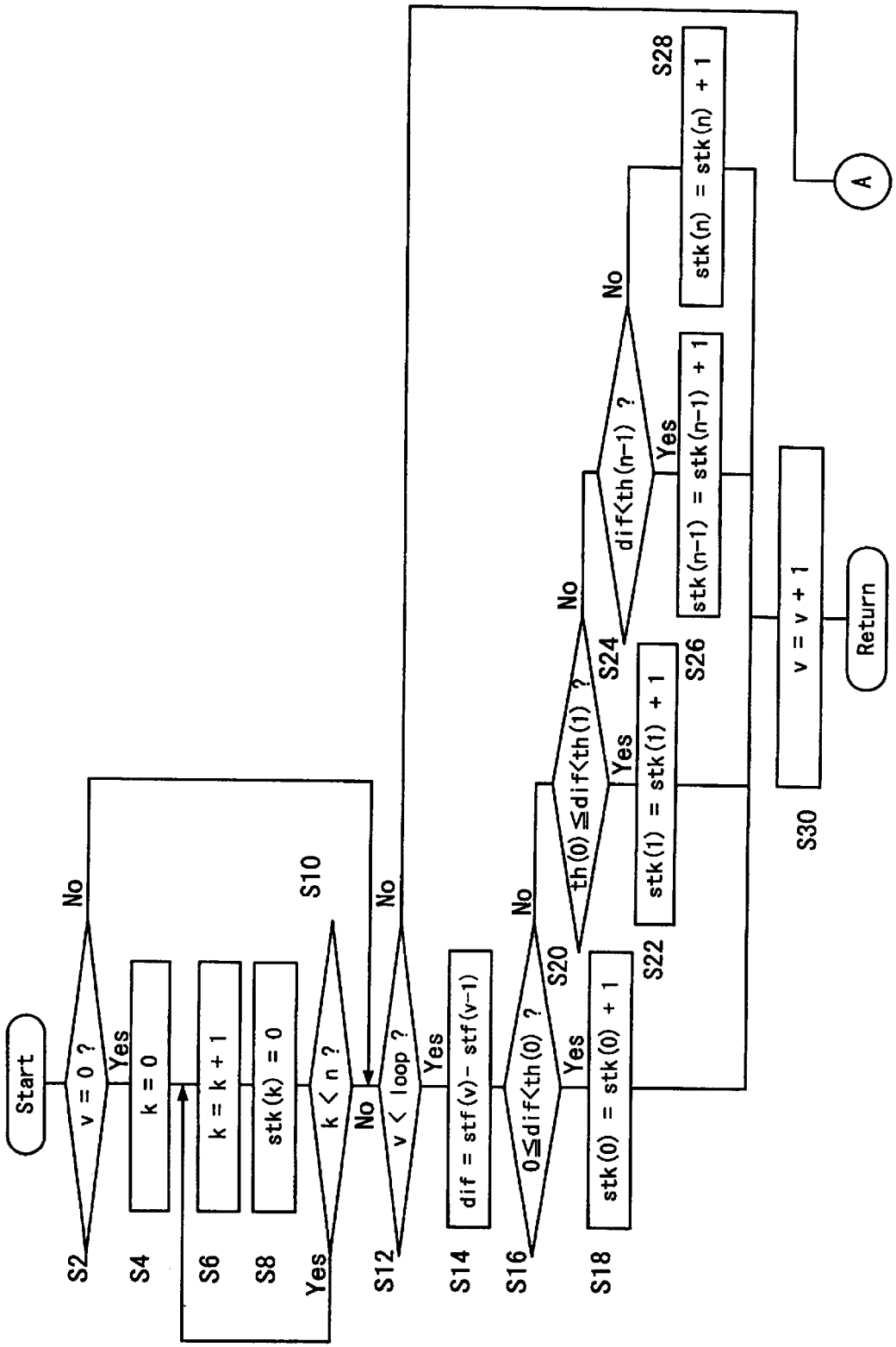
FIG. 18 is a first half of a flow chart showing the detailed operation of a jitter amount calculation/image quality correction amount calculation subroutine shown in FIG. 15.
Figure 19:
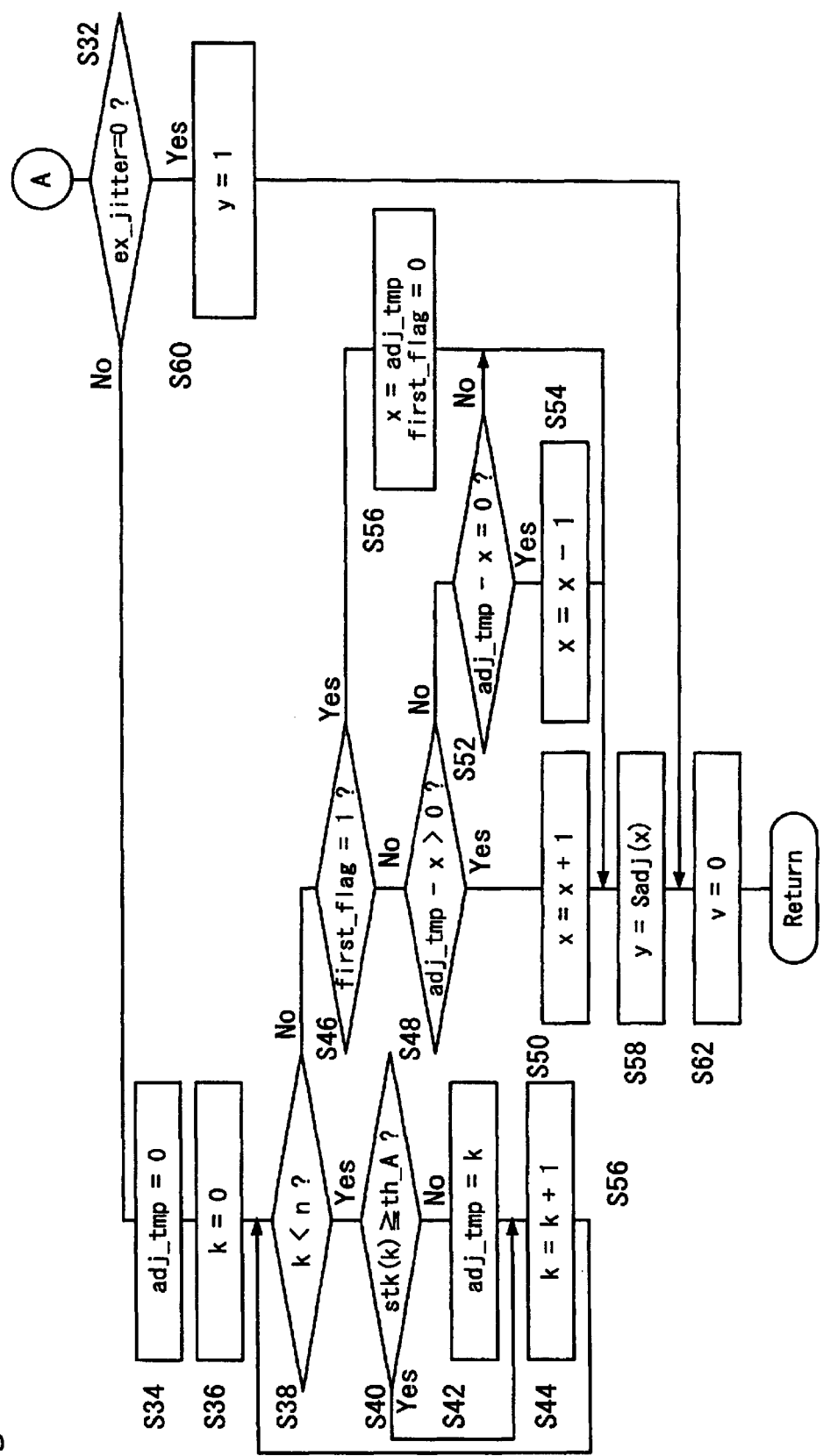
FIG. 19 is a second half of the flow chart showing the detailed operation of the jitter amount calculation/image quality correction amount calculation subroutine shown in FIG. 15.

With reference to FIGS. 18 and 19, the jitter amount calculation/image correction adjustment amount calculation subroutine of #1100 is described.

First, in step S2, it is determined whether the field v is 0 or not. If Yes, that is, if it is the first field for the video signal Sv, the procedure goes to step S4.

In step S4, a variable k representing the stack number is set to 0. The procedure then goes to step S6.

In step S6, k is incremented by 1. The procedure then goes to step S8.

In step S8, stk(k) is set to 0. The procedure then goes to step S10.

In step S10, it is determined whether k is smaller than n or not. If Yes, the procedure returns to steps S6 and then S8. The procedure repeats a loop process of steps S6, S8, S10 until it is determined k=n. If No in this step, on the other hand, the procedure exits from the above loop to a next step S12.

On the other hand, if No in step S2, that is, if it is determined that the video signal Sv has been continuously processed, the procedure skips the above steps S4 to S10, and goes to step S12.

In step S12, it is determined whether the field v is smaller than the loop or not. If Yes, the procedure goes to step S14.

In step S14, the vertical period of the previous field Stf(v−1) is subtracted from the vertical period of the present field Stf(v), and the result is set as dif. dif corresponds to the in-field period difference ΔTf shown in FIGS. 20 and 21. The procedure then goes to step S16.

In step S16, it is determined whether dif is not less than 0 and is smaller than th(0). If Yes, the procedure goes to step S18.

In step S18, stk(0) is incremented by 1. By repeating this step, the frequency in the stack stk(0) can be calculated. The procedure then goes to step S30.

If No in step S20, on the other hand, the procedure goes to step S24, wherein the frequency in a stack Stk(n−1) is to be found.

In step S20, it is determined whether dif is not less than th(0) and is smaller than th(1). If Yes, the procedure goes to step S22.

In step S22, stk(1) is incremented by 1. By repeating this step, the frequency in the stack Stk(1) can be calculated. The procedure then goes to step S30.

If No in step S20, on the other hand, the procedure toes to step S24, wherein the frequency in a stack Stk(n−1) is to be found.

In step S24, it is determined whether dif is smaller than th(n−1). If Yes, the procedure goes to step 526. If Yes, the procedure goes to step S26.

In step S26, stk(n−1) is incremented by 1. The procedure then goes to step S30.

If No in step S24, on the other hand, the procedure goes to step S28, wherein the frequency in a next stack Stk(n) is to be found.

In step S28, stk(n) is incremented by 1. The procedure then goes to step S30. Note that a case where n is 4 is shown in FIG. 18 as space permits. As described above, however, n maybe an arbitrary number appropriately determined for obtaining effects of smoother correction adjustment. Note that, after steps S18, S22, S26, and S28, a histogram of the jitter amount can be obtained.

Furthermore, if No in the above step S12, that is, if it is determined that v is equal to loop, the procedure goes to step S32.

In step S32, it is determined whether the jitter confirmation flag ex_jitter is 0 or not. If No, that is, if it is confirmed that the video signal Sv is the jitter signal Svj, the procedure goes to step S34.

In step S34, adj_tem is set to 0. The procedure then goes to a next step S36.

In step S36, k is set to 0. The procedure then goes to a next step S38.

In step S38, it is determined whether k is smaller than n. If Yes, the procedure goes to step S40.

In step S40, it is determined whether stk(k)≧th_A. If No, the procedure goes to step S42.

In step S42, adj_temp is set to k. The procedure then goes to step S44.

In step S44, k is incremented by 1. The procedure returns to step S38.

If Yes in step S40, on the other hand, the procedure skips step S42, and goes to step S44.

If No in step S38, that is, if k=n, the procedure goes to step S46.

In step S46, it is determined whether first_flag is 1 or not. If No, the procedure goes to step S48.

In step S48, it is determined whether a value obtained by subtracting the adjustment variable x from adj_tem is larger than 0. If Yes, the procedure goes to step S50.

In step S50, the adjustment variable x is incremented by 1. The procedure then goes to step S58.

In step S58, Sadj(x) is set as y. The procedure then goes to step S62.

In step S62, the field v is set to 0. The procedure ends the present subroutine.

If No in step S48, on the other hand, the procedure goes to step S52. In step S52, it is determined whether adj_tmp is equal to the adjustment variable x. If Yes, the procedure goes to step S54.

In step S54, the adjustment variable x is decremented by 1. The procedure then goes to step S58.

If No in step S46, the procedure goes to step S56.

In step S56, the value of the adjustment variable x is set as adj_tmp, and first_flag is set to 0. The procedure then goes to step S58.

On the other hand, if Yes in step S32, that is, if it has been confirmed that the video signal Sv is the non-jitter signal Svjn, the procedure goes to step S60.

Then, based on the adjustment amount of image quality correction y calculated in the present subroutine, image quality correction adjustment is carried out in steps #90OR and #1000 as described above. Note that step #90OR is basically the same as the above step #900.

As such, according to the present invention, a video signal including jitter components is automatically detected, and the amount of jitter is measured. According to the amount, the amount of horizontal edge correction, the amount of speed modulation, and the amount of noise reduction is adaptively increased or decreased. Thus, it is possible to structure a broadcast receiving device that corrects optimal image quality according to the state of an input signal.

INDUSTRIAL APPLICABILITY

As such, the present invention can be utilized for such purpose as achieved in television, that is, for reproducing and displaying an image from a video signal.

What is claimed is:

1. A jitter detection device for detecting jitter in a video signal, said device comprising:

a vertical period measuring means for measuring a vertical period for one field of the video signal and generating a vertical period signal;

a jitter determination means for determining, based on the vertical period signal, whether the video signal jitters or not, and generating a jitter determination signal;

a jitter determination counting means for counting, based on the jitter determination signal, the number of times it is successively determined that the video signal jitters, and generating a jitter determination counter signal;

a jitter confirmation means for confirming, based on the jitter determination counter signal, that the video signal is a jitter signal if it is determined a first predetermined number of times that the video signal jitters;

a non-jitter counting means for counting, based on the jitter determination signal, the number of times it is successively determined that the video signal does not jitter, and generating a non-jitter determination counter signal;

a non-jitter confirmation means for confirming, based on the non-jitter determination counter signal, that the video signal is a non-jitter signal if it is determined a second predetermined number of times that the video signal does not jitter.

2. The jitter detection device according to claim 1, wherein said jitter determination means:

determines that the video signal jitters when an absolute value of a difference between a vertical period of a present field and a vertical period of a previous field is larger than 1; and determines that the video signal does not jitter when the absolute value is smaller than 1.

3. The jitter detection device according to claim 1, further comprising a jitter amount calculating means for sequentially calculating a dispersion value of vertical periods.

4. An image quality correction device for correcting quality of an image reproduced based on a video signal according to an amount of jitter in the video signal, said device comprising an image quality correction adjusting means that comprises at least one of:

a noise reducing means for reducing noise of the video signal based on a predetermined correction amount of noise reduction;

a horizontal edge enhancing means for enhancing a horizontal edge of the video signal based on a predetermined correction amount of horizontal edge enhancement; and a scan speed modulating means for enhancing a specific part of the video signal based on a predetermined amount of scan speed modulation;

wherein, according to the amount of jitter, said image quality correction device increases the correction amount of noise reduction by a predetermined adjustment value, decreases the correction amount of horizontal edge enhancement by the adjustment value, and decreases the amount of scan speed modulation by the adjustment value.

5. The image quality correction device according to claim 4, further comprising a jitter detection device that comprises:

a vertical period measuring means for measuring a vertical period for one field of the video signal and generating a vertical period signal;

a jitter determination means for determining, based on the vertical period signal, whether the video signal jitters or not, and generating a jitter determination signal;

a jitter determination counting means for counting, based on the jitter determination signal, the number of times it is successively determined that the video signal jitters, and generating a jitter determination counter signal;

a jitter confirmation means for confirming, based on the jitter determination counter signal, that the video signal is a jitter signal if it is determined a first predetermined number of times that the video signal jitters;

a non-jitter counting means for counting, based on the jitter determination signal, the number of times it is successively determined that the video signal does not jitter, and generating a non-jitter determination counter signal;

a non-jitter confirmation means for confirming that the video signal is a non-jitter signal if it is determined, based on the non-jitter determination counter signal, a second predetermined number of times that the video signal does not jitter.

6. The image quality correction device according to claim 5, wherein said image quality correction adjusting means dynamically adjusts at least one of the correction amount of noise reduction, the correction amount of horizontal edge enhancement, and the amount of scan speed modulation, while sequentially calculating a dispersion value of vertical periods.

7. The image quality correction device according to claim 6, wherein said image quality correction adjusting means further comprises a histogram means for generating a histogram composed of frequencies of appearance as the amount of jitter, wherein:

at least one of the correction amount of noise reduction, the correction amount of horizontal edge enhancement, and the amount of scan speed modulation is adjusted by an amount of adjustment predetermined corresponding to the amount of jitter and the frequency of appearance that is larger than a predetermined threshold.

8. The image quality correction device according to claim 4, wherein the amount of jitter in a present field is used as the adjustment value immediately after the video signal is changed from a non-jitter signal to a jitter signal.

9. The image quality correction device according to claim 5, further comprising an adjustment suppressing means for suspending adjustment of at least one of the correction amount of noise reduction, the correction amount of horizontal edge enhancement, and the amount of scan speed modulation if the video signal is changed from the jitter signal to the non-jitter signal.

10. A jitter detection device for detecting jitter in a video signal, said device comprising:

a vertical period measuring unit operable to measure a vertical period for one field of the video signal and generate a vertical period signal;

a jitter determination unit operable to determine, based on the vertical period signal, whether the video signal jitters or not, and generate a jitter determination signal;

a jitter determination counter operable to count, based on the jitter determination signal, the number of times it is successively determined that the video signal jitters, and generate a jitter determination counter signal;

a jitter confirmation unit operable to confirm, based on the jitter determination counter signal, that the video signal is a jitter signal if it is determined a first predetermined number of times that the video signal jitters;

a non-jitter counting unit operable to count, based on the jitter determination signal, the number of times it is successively determined that the video signal does not jitter, and generate a non-jitter determination counter signal;

a non-jitter confirmation unit operable to confirm, based on the non-jitter determination counter signal, that the video signal is a non-jitter signal if it is determined a second predetermined number of times that the video signal does not jitter.

11. The jitter detection device according to claim 10, said jitter determination unit is operable to:

determine that the video signal jitters when an absolute value of a difference between a vertical period of a present field and a vertical period of a previous field is larger than 1; and determine that the video signal does not jitter when the absolute value is smaller than 1.

12. The jitter detection device according to claim 10, further comprising a jitter amount calculator operable to sequentially calculate a dispersion value of vertical periods.

13. An image quality correction device for correcting quality of an image reproduced based on a video signal according to an amount of jitter in the video signal, said device comprising an image quality correction adjuster that comprises at least one of:

a noise reduction unit operable to reduce noise of the video signal based on a predetermined correction amount of noise reduction;

a horizontal edge enhancer operable to enhance a horizontal edge of the video signal based on a predetermined correction amount of horizontal edge enhancement; and a scan speed modulator operable to enhance a specific part of the video signal based on a predetermined amount of scan speed modulation;

wherein, according to the amount of jitter, said image quality correction device is operable to increase the correction amount of noise reduction by a predetermined adjustment value, decrease the correction amount of horizontal edge enhancement by the adjustment value, and decrease the amount of scan speed modulation by the adjustment value.

14. The image quality correction device according to claim 13, further comprising a jitter detection device that comprises:

a vertical period measuring unit operable to measure a vertical period for one field of the video signal and generate a vertical period signal;

a jitter determination unit operable to determine, based on the vertical period signal, whether the video signal jitters or not, and generate a jitter determination signal;

a jitter determination counter operable to count, based on the jitter determination signal, the number of times it is successively determined that the video signal jitters, and generate a jitter determination counter signal;

a jitter confirmation unit operable to confirm, based on the jitter determination counter signal, that the video signal is a jitter signal if it is determined a first predetermined number of times that the video signal jitters;

a non-jitter counting unit operable to count, based on the jitter determination signal, the number of times it is successively determined that the video signal does not jitter, and generate a non-jitter determination counter signal;

a non-jitter confirmation unit operable to confirm that the video signal is a non-jitter signal if it is determined, based on the non-jitter determination counter signal, a second predetermined number of times that the video signal does not jitter.

15. The image quality correction device according to claim 14, wherein said image quality correction adjuster is operable to dynamically adjust at least one of the correction amount of noise reduction, the correction amount of horizontal edge enhancement, and the amount of scan speed modulation, while sequentially calculating a dispersion value of vertical periods.

16. The image quality correction device according to claim 15, wherein said image quality correction adjuster further comprises a histogram unit operable to generate a histogram composed of frequencies of appearance as the amount of jitter, wherein:

at least one of the correction amount of noise reduction, the correction amount of horizontal edge enhancement, and the amount of scan speed modulation is adjusted by an amount of adjustment predetermined corresponding to the amount of jitter and the frequency of appearance that is larger than a predetermined threshold.

17. The image quality correction device according to claim 13, wherein the amount of jitter in a present field is used as the adjustment value immediately after the video signal is changed from a non-jitter signal to a jitter signal.

18. The image quality correction device according to claim 14, further comprising an adjustment suppressor operable to suspend adjustment of at least one of the correction amount of noise reduction, the correction amount of horizontal edge enhancement, and the amount of scan speed modulation if the video signal is changed from the jitter signal to the non-jitter signal.

* * * * *